(12) United States Patent
Nguyen et al.

(10) Patent No.: US 12,248,944 B2
(45) Date of Patent: Mar. 11, 2025

(54) CONTEXT-ENHANCED CATEGORY CLASSIFICATION TO GENERATE PRODUCT CATEGORY LABELS USED TO CONDUCT ELECTRONIC TRANSACTIONS BASED ON REGULATORY RESTRICTIONS

(71) Applicant: PayPal, Inc., San Jose, CA (US)

(72) Inventors: Van Hoang Nguyen, Singapore (SG); Francesco Gelli, Singapore (SG); Zhe Chen, Singapore (SG); Hewen Wang, Singapore (SG); Quan Jin Ferdinand Tang, Singapore (SG); Amit Nahata, Milpitas, CA (US); Rushik Navinbhai Upadhyay, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 374 days.

(21) Appl. No.: 17/547,589

(22) Filed: Dec. 10, 2021

(65) Prior Publication Data

US 2023/0186319 A1 Jun. 15, 2023

(51) Int. Cl.
| | |
|---|---|
| G06Q 30/018 | (2023.01) |
| G06F 16/33 | (2019.01) |
| G06F 16/3332 | (2025.01) |
| G06F 40/295 | (2020.01) |
| G06F 40/47 | (2020.01) |
| G06Q 20/40 | (2012.01) |

(52) U.S. Cl.
CPC ....... *G06Q 30/018* (2013.01); *G06F 16/3334* (2019.01); *G06F 40/295* (2020.01); *G06F 40/47* (2020.01); *G06Q 20/407* (2013.01)

(58) Field of Classification Search
CPC .................................................. G06Q 30/018
See application file for complete search history.

(56) References Cited

U.S. PATENT DOCUMENTS

2017/0177712 A1 6/2017 Kopru et al.
2020/0327589 A1* 10/2020 Greenberg ............. G06Q 20/36
(Continued)

OTHER PUBLICATIONS

International Search Report and Written Opinion mailed Mar. 23, 2023, in counterpart PCT patent application No. PCT/US22/52595; 10 pgs.

(Continued)

*Primary Examiner* — Farzad Kazeminezhad
(74) *Attorney, Agent, or Firm* — Greenberg Traurig, LLP

(57) ABSTRACT

Systems/techniques for facilitating context-enhanced category classification are provided. In various embodiments, a system can access a first textual description of a product or service. In various aspects, the system can identify, via execution of named entity recognition, one or more keywords in the first textual description. In various instances, the system can access, from a set of queryable databases, one or more second textual descriptions that respectively correspond to the one or more keywords. In various cases, the system can generate, via execution of word embedding, a first numerical representation of the first textual description and one or more second numerical representations of the one or more second textual descriptions. In various aspects, the system can identify, via execution of a machine learning classifier, a category label for the product or service, based on the first numerical representation and the one or more second numerical representations.

20 Claims, 16 Drawing Sheets

(56) References Cited

U.S. PATENT DOCUMENTS

2020/0364725 A1\* 11/2020 Hoehne ............... G06Q 30/018
2021/0019577 A1    1/2021 Zan et al.
2021/0141995 A1    5/2021 Lundgaard et al.
2021/0271870 A1    9/2021 Ni et al.

OTHER PUBLICATIONS

GITHUB | "Explosion / spaCy. Industrial-Strength Natural Language Processing (NPL) in Python". Webpage https://github.com/explosion/spaCy, last accessed Dec. 2, 2021, 7 pages.
Reimers, N. et al. | "Sentence-BERT: Sentence Embeddings using Siamese BERT-Networks". arXiv:1908.10084v1 [cs.CL] Aug. 27, 2019, 11 pages.
Reimers, N. et al. | "Making Monolingual Sentence Embeddings Multilingual using Knowledge Distillation". Association for Computational Linguistics, arXiv:2004.09813v2 [cs.CL] Oct. 5, 2020, 14 pages.
Vaswani, A. et al. | "Attention Is All You Need". 31st Conference on Neural Information Processing Systems (NIPS 2017), Long Beach, CA, USA, 11 pages.
Paypal Developer | "Business Categories and Subcategories". Website https://developer.paypal.com/docs/archive/adaptive-accounts/integration-guide/ACBusinessCategories/, last accessed on Nov. 23, 2021, 11 pages.
Spacy | "Industrial-Strength Natural Language Processing in Python". Webpage https://spacy.io/, last accessed Dec. 2, 2021, 9 pages.
Elastic | https://www.elastic.co/, webpage, last accessed on Dec. 10, 2021, 5 pages.

\* cited by examiner

CONTEXT-ENHANCED CATEGORY CLASSIFICATION TO GENERATE PRODUCT CATEGORY LABELS USED TO CONDUCT ELECTRONIC TRANSACTIONS BASED ON REGULATORY RESTRICTIONS

TECHNICAL FIELD

The subject disclosure relates generally to category classification, and more specifically to systems and/or techniques that can facilitate context-enhanced category classification.

BACKGROUND

Certain types of products or services are subject to regulatory restrictions. Accordingly, when given a product/service that is involved in an electronic transaction, it can be desired to determine whether the given product/service is subject to a regulatory restriction, so that the electronic transaction can be prevented or otherwise regulated. Existing techniques for determining whether a given product/service is subject to a regulatory restriction operate by comparing a keyword associated with the given product/service to a list of keywords associated with products/services that are known to be restricted. Unfortunately, such existing techniques experience excessively high rates of false positive errors.

Accordingly, systems and/or techniques that can address one or more of these technical problems can be desirable.

DETAILED DESCRIPTION

Figure 1:
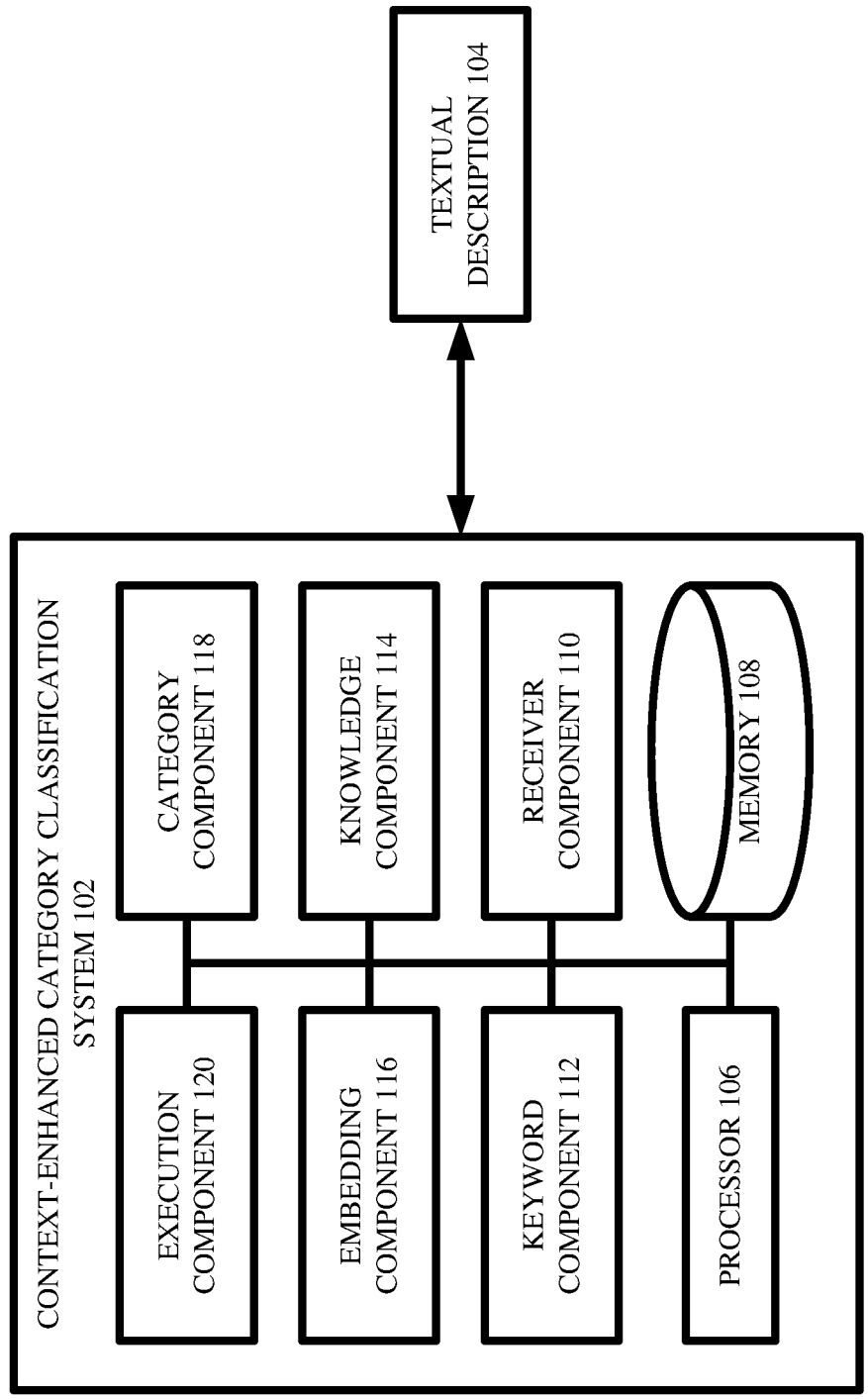
FIG. 1 illustrates a high-level block diagram of an example, non-limiting system that facilitates context-enhanced category classification in accordance with one or more embodiments described herein.

The following detailed description is merely illustrative and is not intended to limit embodiments and/or application or uses of embodiments. Furthermore, there is no intention to be bound by any expressed or implied information presented in the preceding Background section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Certain types of products and/or services can be subject to regulatory restrictions. For example, anti-money laundering laws, know-your-customer laws, and/or any other laws in any given jurisdiction can prohibit and/or otherwise heavily regulate the sale, use, and/or importation of a particular category of products/services (e.g., products originating from a particular country). Accordingly, when given a product/service that is involved in an electronic transaction, it can be desired to determine whether the given product/service is subject to a regulatory restriction, so that the electronic transaction can be prevented or otherwise regulated.

Existing techniques for determining whether a given product/service is subject to a regulatory restriction operate by comparing a keyword associated with the given product/service to a list of keywords associated with products/services that are known to be restricted. Unfortunately, and as recognized by the present inventors, homonyms (e.g., words that have different meanings in different contexts) cause such existing techniques to experience excessively high rates of false positive errors. As a non-limiting example, the word "Persia" can be flagged as a word that is known to correspond to a regulatory restriction, since "Persia" can refer to the geographic location of Iran which can be subject to international economic sanctions and/or embargos. Thus, when existing techniques are implemented, any product/service that is associated with the word "Persia" is deemed to be subject to the regulatory restriction. However, the word "Persia" can be used in contexts in which it is not referring to the geographic location of Iran. For instance, the word "Persia" can be associated with a video game that is entitled "Prince of Persia." Accordingly, existing techniques would erroneously conclude that an electronic transaction involving the purchase of the video "Prince of Persia" is subject to the regulatory restriction. This explains why existing techniques can suffer from false positive rates that are in excess of 90%.

Accordingly, systems and/or techniques that can address one or more of these technical problems can be desirable.

Various embodiments described herein can address one or more of these technical problems. One or more embodiments described herein include systems, computer-implemented methods, apparatus, and/or computer program products that can facilitate context-enhanced category classification. More specifically, the inventors of various embodiments described herein recognized that existing techniques, which rely on mere keyword comparisons, are very likely to erroneously determine that a given product/service is subject to a regulatory restriction because such existing techniques fail to take into account the particular context of the given product/service. Accordingly, the present inventors devised various embodiments described herein, which can be considered as a computerized tool (e.g., any suitable combination of computer-executable hardware and/or computer-executable software) that can electronically determine whether a given product/service is subject to a regulatory restriction, based on a context of the given product/service.

In various embodiments, a computerized tool as described herein can include a receiver component, a keyword component, a knowledge component, an embedding component, a category component, and/or an execution component.

In various embodiments, there can be an electronic transaction (e.g., a requested and/or pending e-commerce purchase) that involves a product and/or service.

In various embodiments, the receiver component of the computerized tool can electronically receive and/or otherwise electronically access a first textual description of the product/service. In various aspects, the first textual description can be natural language text that describes the product/service (e.g., that explains one or more features and/or characteristics of the product/service). For example, the first textual description can be and/or include a title of the product/service. As another example, the first textual description can be and/or include one or more sentences and/or bullet points with which the product/service is tagged (e.g., such sentences and/or bullet points can be provided by a vendor of the product/service). In various instances, the receiver component can electronically retrieve the first textual description from any suitable computing device. In any case, the receiver component can electronically obtain and/or access the first textual description, such that other components of the computerized tool can electronically interact with (e.g., read, write, edit, manipulate) the first textual description.

In various embodiments, the keyword component of the computerized tool can electronically identify one or more keywords that are associated with the product/service, based on the first textual description. More specifically, the keyword component can electronically perform and/or otherwise electronically execute any suitable named entity recognition technique on the first textual description. In various instances, application of named entity recognition to the first textual description can extract one or more words that are present within the first textual description (e.g., one or more words that are used to describe and/or explain the product/service). In various cases, such one or more extracted words can be considered and/or referred to as the one or more keywords.

In various embodiments, the knowledge component of the computerized tool can electronically store, electronically maintain, electronically control, and/or otherwise electronically access one or more queryable databases. In various aspects, the one or more queryable databases can exhibit any suitable centralized and/or decentralized data structures (e.g., graph data structures, relational data structures, hybrid data structures), whether remote from and/or local to the knowledge component. In various instances, the knowledge component can electronically search through the one or more queryable databases for the one or more keywords. In various cases, such searching can yield one or more second textual descriptions that respectively correspond to the one or more keywords. That is, for each particular keyword in the one or more keywords, the knowledge component can identify a respectively corresponding textual description that is stored within the one or more queryable databases, where such respectively corresponding textual description can define, explain, and/or otherwise provide expository information regarding the particular keyword.

Note that, at this point, there can be the first textual description that corresponds to the product/service (e.g., that directly describes the product/service), and there can be the one or more second textual descriptions that respectively correspond to the one or more keywords (e.g., that directly describe the one or more keywords, and thus that indirectly relate to the product/service). Since the one or more keywords can be present within the first textual description, the one or more second textual descriptions can be considered as collectively capturing, representing, indicating, and/or otherwise suggesting contextual information of the product/service.

In various embodiments, the embedding component of the computerized tool can electronically generate a first numerical representation based on the first textual description, and the embedding component can electronically generate one or more second numerical representations based on the one or more second textual descriptions. More specifically, the embedding component can electronically apply any suitable word embedding technique (e.g., sentence-BERT) to the first textual description, so as to convert the first textual description into one or more scalars, one or more vectors, one or more matrices, and/or one or more tensors, where such one or more scalars, vectors, matrices, and/or tensors can be considered as the first numerical representation. Similarly, the embedding component can electronically apply any suitable word embedding technique to each of the one or more second textual descriptions, so as to convert each of the one or more second textual descriptions into one or more scalars, one or more vectors, one or more matrices, and/or one or more tensors, where such scalars, vectors, matrices, and/or tensors can collectively be considered as the one or more second numerical representations.

In various embodiments, the category component of the computerized tool can electronically store, electronically maintain, electronically control, and/or otherwise electronically access a machine learning classifier. In various aspects, the machine learning classifier can exhibit any suitable artificial intelligence architecture. For example, the machine learning classifier can be a deep learning neural network. In such case, the machine learning classifier can include any suitable number of layers (e.g., input layer, one or more hidden layers, output layer), any suitable numbers of neurons in various layers (e.g., different layers can have the same and/or different numbers of neurons as each other), any suitable activation functions (e.g., softmax, sigmoid, hyperbolic tangent, rectified linear unit) in various neurons (e.g., different neurons can have the same and/or different activation functions as each other), and/or any suitable interneuron connections (e.g., forward connections, skip connections, recurrent connections). As other examples, the machine learning classifier can be a support vector machine, a tree-based model, and/or a naïve Bayes model.

In any case, the category component can electronically generate a category label for the product/service, by leveraging the machine learning classifier, the first numerical representation, and the one or more second numerical representations.

For example, in some cases, the machine learning classifier can be configured to receive as input both the first numerical representation and the one or more second numerical representations, and the machine learning classifier can be configured to produce as output the category label. More specifically, the category component can concatenate together the first numerical representation with the one or more second numerical representations, the category component can feed such concatenation to an input layer of the machine learning classifier, such concatenation can complete a forward pass through one or more hidden layers of the machine learning classifier, and an output layer of the machine learning classifier can compute the category label based on activations provided by the one or more hidden layers.

As another example, in some cases, the category component can electronically apply any suitable self-attention technique to the one or more second numerical representations, thereby yielding one or more adjusted numerical representations. Furthermore, in such cases, the category component can apply any suitable max pooling function to the one or more adjusted numerical representations, thereby yielding an aggregated numerical representation. In various instances, the machine learning classifier can be configured to receive as input both the first numerical representation and the aggregated numerical representation, and the machine learning classifier can be configured to produce as output the category label. In particular, the category component can concatenate together the first numerical representation with the aggregated numerical representation, the category component can feed such concatenation to an input layer of the machine learning classifier, such concatenation can complete a forward pass through one or more hidden layers of the machine learning classifier, and an output layer of the machine learning classifier can compute the category label based on activations provided by the one or more hidden layers.

In any case, the category label can be one or more scalars, one or more vectors, one or more matrices, one or more tensors, one or more character strings, and/or any suitable combination thereof that indicate and/or otherwise represent a class, category, grouping, and/or context to which the product/service belongs (e.g., to which the machine learning classifier infers that the product/service belongs). As some non-limiting examples, the category label can indicate that the product/service belongs to an "arts and crafts" category/context, to a "beauty and fragrances" category/context, to a "clothing and attire" category/context, to a "computers and electronics" category/context, to an "entertainment and media" category/context, to a "food and beverage" category/context, to a "weapons" category/context, and/or to an "oil and gas" category/context. Any other suitable categories and/or any suitable number of other categories can be implemented as desired.

In various embodiments, the execution component of the computerized tool can electronically initiate any suitable electronic action based on the category label. For example, in some cases, the execution component can electronically compare the category label to a restricted category that is known to correspond to a regulatory restriction. If the category label matches the restricted category, the execution component can conclude that the product/service is subject to the regulatory restriction. On the other hand, if the category label does not match the restricted category, the execution component can conclude that the product/service is not subject to the regulatory restriction. If the execution component determines/concludes that the product/service is subject to the regulatory restriction, the execution component can electronically cancel the electronic transaction, can electronically block and/or impede the electronic transaction from proceeding, and/or can electronically generate and/or transmit an alert message that indicates that the product/service, and thus the electronic transaction, is subject to the regulatory restriction. On the other hand, if the execution component determines/concludes that the product/service is not subject to the regulatory restriction, the execution component can electronically permit the electronic transaction to proceed.

Accordingly, various embodiments described herein can be considered as a computerized tool that can electronically classify/categorize a product/service based on contextual information about that product/service. Because such embodiments can take into account contextual information about the product/service (e.g., definitions of keywords that describe the product/service), such embodiments can exhibit significantly lower false positive rates as compared to existing techniques which merely perform keyword comparisons.

Various embodiments described herein can be employed to use hardware and/or software to solve problems that are highly technical in nature (e.g., to facilitate context-enhanced category classification), that are not abstract and that cannot be performed as a set of mental acts by a human. Further, some of the processes performed can be performed by a specialized computer (e.g., trained machine learning classifier, such as a neural network) for carrying out defined tasks related to context-enhanced category classification.

For example, some defined tasks of various embodiments described herein can include: accessing a first textual description of a product or service; identifying, via execution of named entity recognition, one or more keywords in the first textual description; accessing, from a set of queryable databases, one or more second textual descriptions that respectively correspond to the one or more keywords; generating, via execution of word embedding, a first numerical representation of the first textual description and one or more second numerical representations of the one or more second textual descriptions; and identifying, via execution of a machine learning classifier, a category label for the product or service, based on the first numerical representation and the one or more second numerical representations. In some cases, such defined tasks can further include: comparing the category label with one or more restricted categories; and when the category label matches at least one of the one or more restricted categories, initiating a remedial action with respect to the electronic transaction.

Such defined tasks are not performed manually by humans. Indeed, neither the human mind nor a human with pen and paper can electronically retrieve a textual description of a product/service, electronically execute named entity recognition on the textual description so as to extract multiple keywords, electronically query databases for the multiple keywords thereby yielding multiple other textual descriptions, electronically execute word embedding on the various textual descriptions to convert them into numerical representations, and electronically execute a machine learning classifier on the numerical representations thereby yielding a category label for the product/service. Instead, various embodiments described herein are inherently and inextricably tied to computer technology and cannot be implemented outside of a computing environment (e.g., named entity recognition, word embedding, and machine learning classifiers are inherently computerized constructs/techniques that cannot be implemented in any sensible, practical, and/or reasonable way without computers).

In various instances, embodiments described herein can integrate into a practical application the disclosed teachings regarding context-enhanced category classification. As explained above, existing techniques for determining whether a given product/service is subject to a regulatory restriction involve comparing a keyword that is associated with the given product/service to a list of keywords that are known to correspond to the regulatory restriction. As the present inventors recognized, such existing techniques result in extraordinarily high false positive rates because such existing techniques do not take into account the context of the product/service. More specifically, if the keyword that is associated with the given product/service is a homonym, such keyword can have different meanings in different contexts. Accordingly, the keyword can be known to correspond to the regulatory restriction when used in a first context, but the keyword can fail to correspond to the regulatory restriction when used in a second context. However, existing techniques simply perform a keyword comparison and do not take context into account at all. Thus, even though the given product/service can utilize the keyword in the second context (e.g., meaning that the product/service is not subject to the regulatory restriction), existing techniques would erroneously conclude that the product/service is subject to the regulatory restriction since the keyword when used in the first context is known to correspond to the regulatory restriction. This causes existing techniques to exhibit false positive rates in excess of 90%. To address this significant technical failure of existing techniques, various embodiments described herein do not perform a mere keyword comparison. Instead, when given a textual description of a product/service, various embodiments described herein extract keywords from the given textual description, look up definitions of the extracted keywords in one or more queryable databases, convert both the given textual description and the one or more queried definitions into numerical representations, and execute a machine learning classifier on such numerical representations to generate a category label for the product/service. Because the queried definitions of the extracted keywords can be considered as collectively representing and/or containing contextual information of the product/service, and because the category label can be generated based on such queried definitions, the category label can be considered as indicating and/or otherwise being based on the true context of the product/service. Thus, such category label can be used to determine whether the product/service is subject to a known regulatory restriction with a lower likelihood of false positive error. Accordingly, various embodiments described herein constitute a concrete and tangible technical improvement as compared to existing techniques, and thus such embodiments certainly qualify as a useful and practical application of computers.

Moreover, in various aspects, embodiments described herein can control real-world and/or tangible devices based on the disclosed teachings. For example, a computerized tool as described herein can electronically execute a real-world machine learning classifier (e.g., neural network) and can electronically prohibit and/or permit a real-world electronic transaction based on results outputted by the real-world machine learning classifier.

It should be appreciated that the figures described herein are non-limiting examples of various embodiments.

FIG. 1 illustrates a high-level block diagram of an example, non-limiting system 100 that can facilitate context-enhanced category classification in accordance with one or more embodiments described herein. As shown, a context-enhanced category classification system 102 can be electronically integrated, via any suitable wired and/or wireless electronic connection, with a textual description 104.

In various embodiments, the textual description 104 can correspond to a product and/or service that is involved in an electronic transaction. For example, an e-commerce customer can be attempting to purchase and/or rent the product/service from an online vendor, and such purchase/rent attempt can be considered as the electronic transaction. In various aspects, the textual description 104 can be any suitable structured and/or unstructured natural language text of any suitable length (e.g., having any suitable number of words and/or number of letters) that describes, defines, discusses, and/or otherwise explains information about the product/service. For instance, the textual description 104 can describe, define, discuss, and/or explain any suitable features and/or characteristics of the product/service, such as a title of the product/service, one or more uses of the product/service, and/or one or more benefits of the product/service. In various aspects, the textual description 104 can be provided and/or otherwise generated by the online vendor that is attempting to sell the product/service.

In any case, it can be desired to categorize and/or classify the product/service based on the textual description 104. In various instances, the context-enhanced category classification system 102 can facilitate such categorization and/or classification, as described herein.

In various embodiments, the context-enhanced category classification system 102 can comprise a processor 106 (e.g., computer processing unit, microprocessor) and a computer-readable memory 108 that is operably coupled to the processor 106. The memory 108 can store computer-executable instructions which, upon execution by the processor 106, can cause the processor 106 and/or other components of the context-enhanced category classification system 102 (e.g., receiver component 110, keyword component 112, knowledge component 114, embedding component 116, category component 118, and/or execution component 120) to perform one or more acts. In various embodiments, the memory 108 can store computer-executable components (e.g., receiver component 110, keyword component 112, knowledge component 114, embedding component 116, category component 118, and/or execution component 120), and the processor 106 can execute the computer-executable components.

In various embodiments, the context-enhanced category classification system 102 can comprise a receiver component 110. In various embodiments, the receiver component 110 can electronically receive and/or otherwise electronically access the textual description 104. In various aspects, the receiver component 110 can electronically retrieve the textual description 104 from any suitable computing device (not shown) and/or from any suitable database (not shown), whether remote from and/or local to the receiver component 110. In any case, the receiver component 110 can electronically obtain and/or access the textual description 104, such that other components of the context-enhanced category classification system 102 can electronically interact with the textual description 104.

In various embodiments, the context-enhanced category classification system 102 can further comprise a keyword component 112. In various aspects, as described herein, the keyword component 112 can electronically extract and/or identify a set of keywords that are used in the textual description 104.

In various embodiments, the context-enhanced category classification system 102 can further comprise a knowledge component 114. In various instances, as described herein, the knowledge component 114 can electronically identify one or more other textual descriptions that respectively correspond to the one or more keywords.

In various embodiments, the context-enhanced category classification system 102 can further comprise an embedding component 116. In various cases, as described herein, the embedding component 116 can electronically convert the textual description 104 and the one or more other textual descriptions into numerical representations.

In various embodiments, the context-enhanced category classification system 102 can further comprise a category component 118. In various aspects, as described herein, the category component 118 can electronically execute a machine learning classifier on the numerical representations, thereby yielding a category label for the product/service.

In various embodiments, the context-enhanced category classification system 102 can further comprise an execution component 120. In various instances, as described herein, the execution component 120 can electronically initiate any suitable electronic actions based on the category label, such as cancelling and/or permitting the electronic transaction to proceed.

Figure 2:
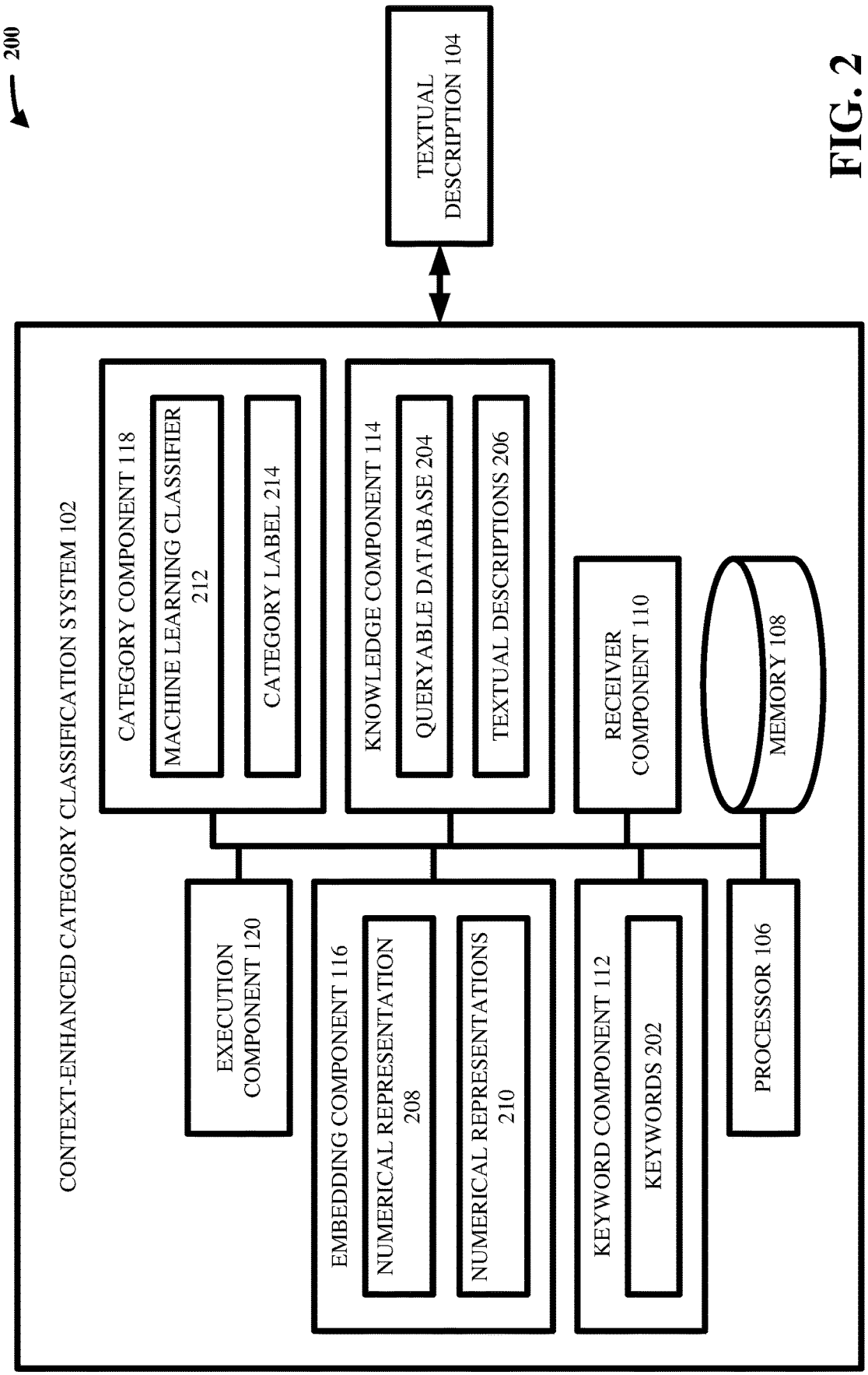
FIG. 2 illustrates a high-level block diagram of an example, non-limiting system including various additional components that facilitates context-enhanced category classification in accordance with one or more embodiments described herein.

FIG. 2 illustrates a high-level block diagram of an example, non-limiting system 200 including various additional components that can facilitate context-enhanced category classification in accordance with one or more embodiments described herein. As shown, the system 200 can, in some cases, comprise the same components as the system 100, and can further comprise a set of keywords 202, a queryable database 204, a set of textual descriptions 206, a numerical representation 208, a set of numerical representations 210, a machine learning classifier 212, and/or a category label 214.

In various embodiments, the keyword component 112 can electronically identify the set of keywords 202, based on the textual description 104. More specifically, the keyword component 112 can electronically execute any suitable named entity recognition technique on the textual description 104, and the result of such execution of named entity recognition can be the set of keywords 202. This is explained further with respect to FIG. 3.

Figure 3:
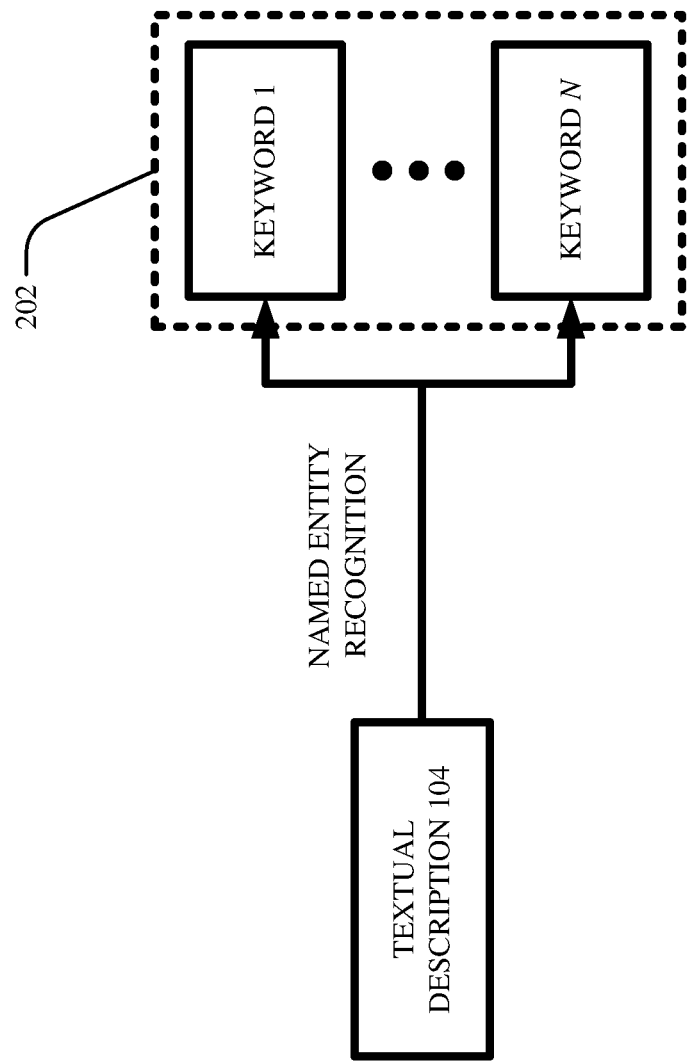
FIG. 3 illustrates an example, non-limiting block diagram showing how keywords can be extracted from a first textual description in accordance with one or more embodiments described herein.

FIG. 3 illustrates an example, non-limiting block diagram 300 showing how the set of keywords 202 can be extracted from the textual description 104 in accordance with one or more embodiments described herein.

As shown, the keyword component 112 can electronically apply named entity recognition to the textual description 104, thereby yielding the set of keywords 202. As those having ordinary skill in the art will appreciate, any suitable named entity recognition technique can be implemented. As a non-limiting example, the keyword component 112 can execute a grammar-based named entity recognition system (e.g., that can be hand-crafted by computational linguists) on the textual description 104, so as to yield the set of keywords 202. As another non-limiting example, the keyword component 112 can execute a machine learning named entity recognition model (e.g., that can be trained to perform named entity recognition in supervised, unsupervised, and/ or reinforcement learning fashion) on the textual description 104, so as to yield the set of keywords 202. In any case, the textual description 104 can be considered as a sequence of words, application of named entity recognition to the textual description 104 can cause a subset of such words to be identified and/or extracted, and such subset of words can be considered as the set of keywords 202.

As shown, the set of keywords 202 can include n keywords for any suitable positive integer n: a keyword 1 to a keyword n. In various aspects, the keyword 1 can be considered as some word that is present within the textual description 104 and that thus relates in some way to the product/service that is described, discussed, and/or explained by the textual description 104. Similarly, the keyword n can be considered as some other word that is present within the textual description 104 and that thus also relates in some way to the product/service that is described, discussed, and/or explained by the textual description 104.

As those having ordinary skill in the art will understand, a keyword (e.g., one of the set of keywords 202) can, in some cases, actually contain more than one word. In such cases, the keyword can be considered and/or referred to as a key-phrase. As a non-limiting example, suppose that the textual description 104 is as follows: "Little People, Big Dreams, authored by Martin Luther King, Jr." In such case, application of named entity recognition to the textual description 104 can identify and/or extract the phrase "Martin Luther King, Jr." Even though the phrase "Martin Luther King, Jr." contains more than a single word, it can nevertheless be considered as a keyword (and/or as a key-phrase).

Referring back to FIG. 2, in various embodiments, the knowledge component 114 can electronically store, electronically maintain, electronically control, and/or otherwise electronically access a queryable database 204. In various aspects, the queryable database 204 can exhibit any suitable formatting and/or structure as desired. As a non-limiting example, the queryable database 204 can be a relational database. As another non-limiting example, the queryable database 204 can be a graph database. As yet another non-limiting example, the queryable database 204 can be a hybrid database. In various instances, the queryable database 204 can be publicly accessible. In various other instances, the queryable database 204 can be privately accessible. In any case, the queryable database 204 can electronically map and/or link keywords to corresponding textual descriptions and/or definitions. Accordingly, for any given keyword, the queryable database 204 can be searched and/or queried, and the result of such searching/querying can be a textual description and/or definition of the given keyword. Thus, in various aspects, the knowledge component 114 can electronically search for each of the set of keywords 202 in the queryable database 204, and such searching can yield a set of textual descriptions 206 that respectively correspond to the set of keywords 202. This is further explained with respect to FIG. 4.

Figure 4:
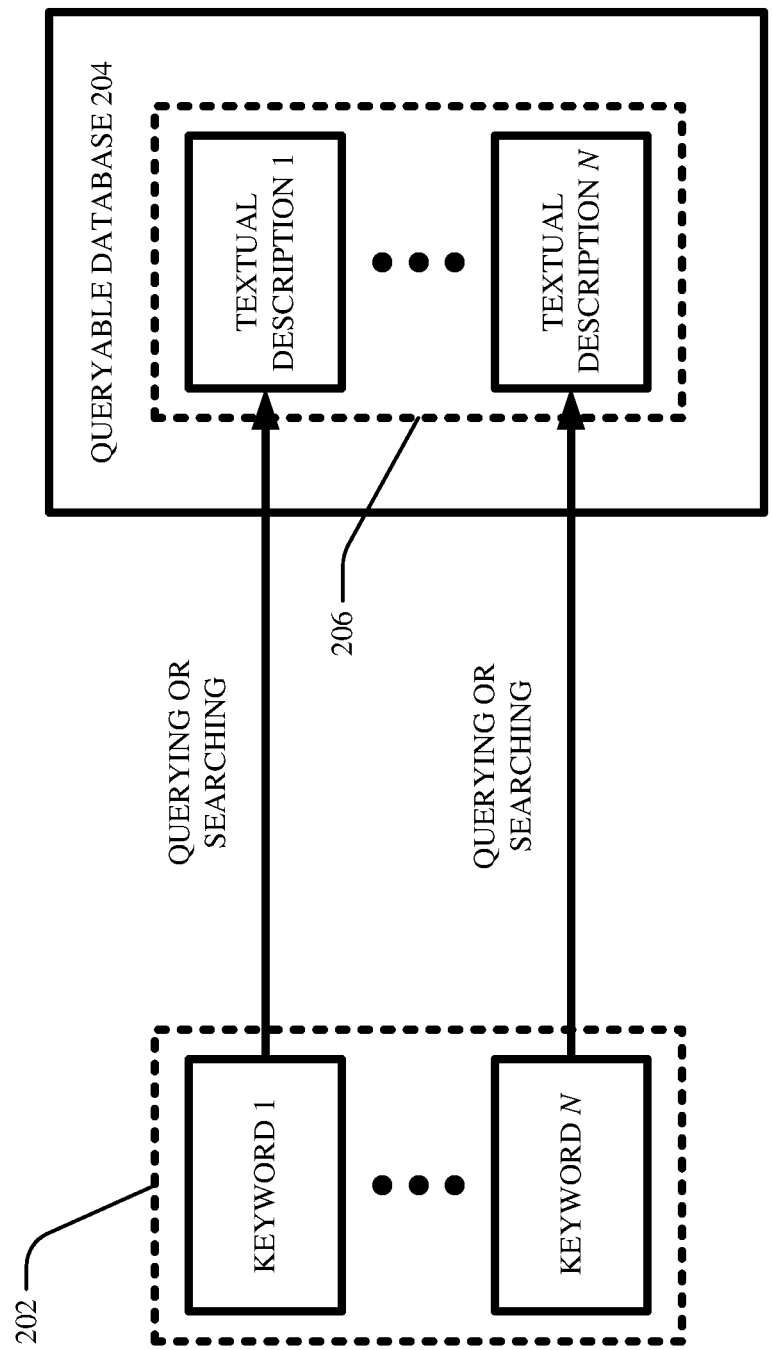
FIG. 4 illustrates an example, non-limiting block diagram showing how second textual descriptions can be found in a queryable database based on keywords in accordance with one or more embodiments described herein.

FIG. 4 illustrates an example, non-limiting block diagram 400 showing how the set of textual descriptions 206 can be found in the queryable database 204 based on the set of keywords 202 in accordance with one or more embodiments described herein.

As mentioned above, the set of keywords 202 can include n keywords for any suitable positive integer n: the keyword 1 to the keyword n. In various aspects, the set of textual descriptions 206 can respectively correspond to the set of keywords 202. Accordingly, in various instances, the set of textual descriptions 206 can include n descriptions: a textual description 1 to a textual description n. In various cases, the textual description 1 can correspond to the keyword 1, and the textual description n can correspond to the keyword n.

In various aspects, as mentioned above, the queryable database 204 can be considered as storing textual descriptions that are correlated and/or linked with keywords. Accordingly, by searching for a particular keyword in the queryable database 204, a particular textual description that corresponds to the particular keyword can be found.

For example, in some instances, the knowledge component 114 can electronically search and/or query the queryable database 204 for the keyword 1. That is, the knowledge component 114 can request the queryable database 204 to return a textual description that corresponds to the keyword 1. In various cases, the queryable database 204 can respond to the request by returning the textual description 1. In various aspects, the textual description 1 can be considered as structured and/or unstructured natural language text of any suitable length (e.g., having any suitable number of words and/or letters) that can describe, discuss, and/or otherwise explain the keyword 1. In some instances, the textual description 1 can be considered as a definition of the keyword 1.

As another example, the knowledge component 114 can electronically search and/or query the queryable database 204 for the keyword n. That is, the knowledge component 114 can request the queryable database 204 to return a textual description that corresponds to the keyword n, and the queryable database 204 can respond to the request by returning the textual description n. Just as above, the textual description n can be considered as structured and/or unstructured natural language text of any suitable length that can describe, discuss, and/or otherwise explain the keyword n. In some instances, the textual description n can be considered as a definition of the keyword n.

In any case, the knowledge component 114 can electronically identify the set of textual descriptions 206 by searching and/or querying the queryable database 204 for the set of keywords 202. In various instances, because the set of keywords 202 are present within the textual description 104 that describes the product/service involved in the electronic transaction, and because the set of textual descriptions 206 respectively define and/or describe the set of keywords 202, the set of textual descriptions 206 can be considered as containing, capturing, and/or otherwise representing contextual information relating to the product/service. As mentioned above, existing techniques for determining whether a product/service is subject to regulatory restrictions simply do not make use of such contextual information.

Although FIG. 2 illustrates the queryable database 204 as being local to and/or otherwise within the knowledge component 114, this is a mere non-limiting example for case of illustration. Those having ordinary skill in the art will appreciate that the queryable database 204 can be remote from the knowledge component 114 in various aspects.

Furthermore, although FIG. 2 illustrates the queryable database 204 as being a single database, this is a mere non-limiting example for case of illustration. Those having ordinary skill in the art will appreciate that the queryable database 204 can include more than one database in various embodiments (e.g., can be a set of queryable databases). For example, the queryable database 204 can be decentralized and/or can include multiple database shards, and different ones of the set of textual descriptions 206 can be stored and/or found within different shards of the queryable database 204.

Referring back to FIG. 2, the embedding component 116 can electronically generate a numerical representation 208 based on the textual description 104, and the embedding component 116 can electronically generate a set of numerical representations 210 based on the set of textual descriptions 206. This is further explained with respect to FIG. 5.

Figure 5:
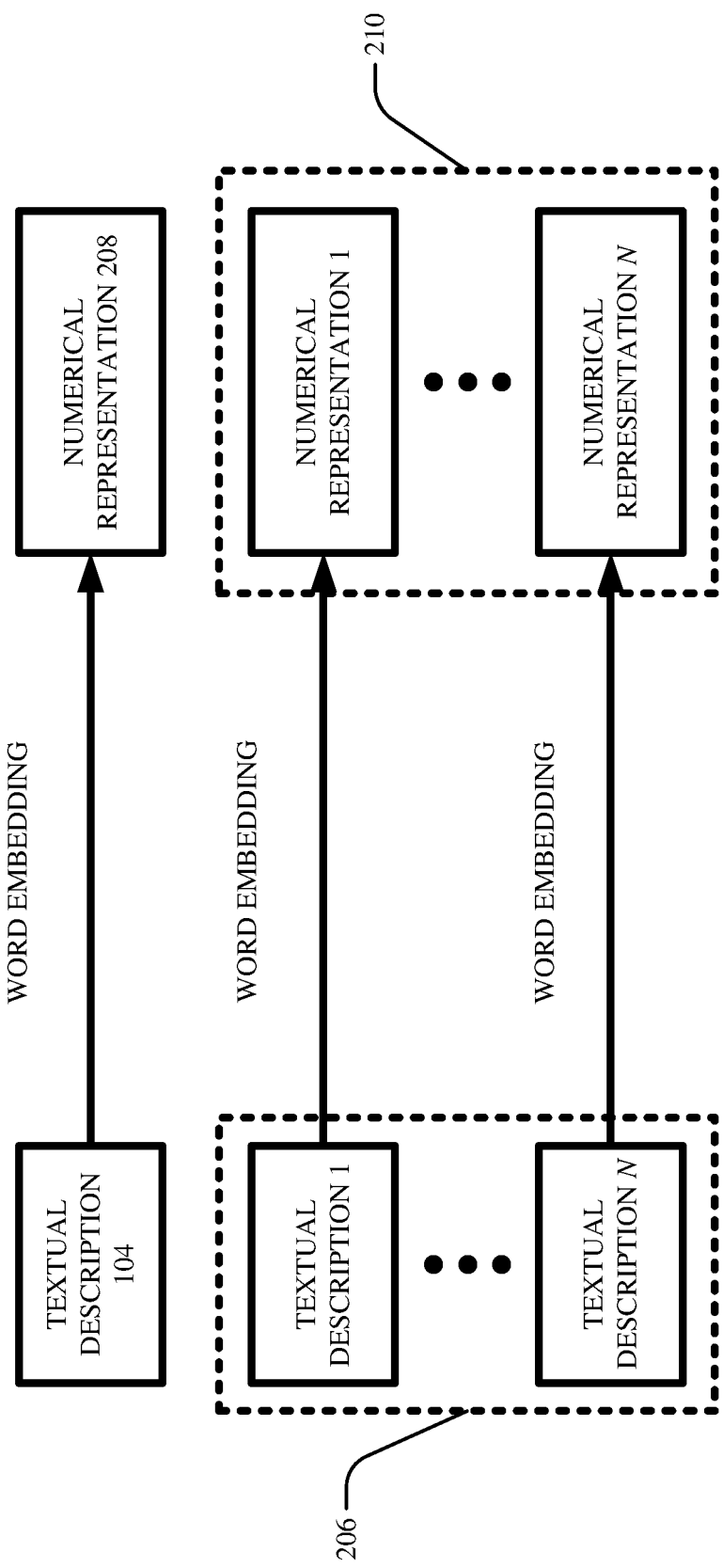
FIG. 5 illustrates an example, non-limiting block diagram showing how numerical representations can be generated based on textual descriptions in accordance with one or more embodiments described herein.

FIG. 5 illustrates an example, non-limiting block diagram 500 showing how the numerical representation 208 can be generated based on the textual description 104 and showing how the set of numerical representations 210 can be generated based on the set of textual descriptions 206 in accordance with one or more embodiments described herein.

As shown, the embedding component 116 can electronically apply any suitable word embedding technique to the textual description 104, thereby yielding the numerical representation 208. Similarly, the embedding component 116 can electronically apply any suitable word embedding technique to the set of textual descriptions 206, thereby yielding the set of numerical representations 210. As those having ordinary skill in the art will appreciate, any suitable word embedding technique can be implemented. As a non-limiting example, the embedding component 116 can facilitate word embedding by computing word co-occurrence matrices and then performing dimensionality reduction on such word co-occurrence matrices. As another non-limiting example, the embedding component 116 can facilitate word embedding by executing a machine learning model (e.g., a neural network) that has been trained (e.g., in supervised, unsupervised, and/or reinforcement learning fashion) to perform word embedding. In any case, application of word embedding to a sequence of text can yield and/or generate a numerical representation (e.g., scalars, vectors, matrices, and/or tensors) for that sequence of text. As those having ordinary skill in the art will understand, a non-limiting example of such a machine learning model can be a sentence-BERT model.

As those having ordinary skill in the art will appreciate, when word embedding is applied to two different sequences of text, the relative meanings of those two different sequences of text can be inferred based on differences between the resulting numerical representations. For example, suppose that a first numerical representation is generated by applying word embedding to a first sequence of text, and suppose that a second numerical representation is generated by applying word embedding to a second sequence of text. If the first numerical representation differs from the second numerical representation by more than any suitable threshold amount (e.g., such difference can be measured in terms of cosine similarity and/or in terms of Euclidean distance), then it can be concluded and/or inferred that the first sequence of text has a different meaning than the second sequence of text. On the other hand, if the first numerical representation differs from the second numerical representation by less than any suitable threshold amount, it can be concluded and/or inferred that the first sequence of text has a similar meaning to the second sequence of text.

In various aspects, the embedding component 116 can execute word embedding on the textual description 104, thereby yielding the numerical representation 208. In various instances, the numerical representation 208 can be considered as any suitable number of scalars, any suitable number of vectors, any suitable number of matrices, any suitable number of tensors, and/or any suitable combination thereof that can represent and/or otherwise correspond to the textual description 104. In some cases, the numerical representation 208 can be a real-valued vector having any suitable number of elements.

Likewise, in various aspects, the embedding component 116 can execute word embedding on each of the set of textual descriptions 206, thereby yielding the set of numerical representations 210. Accordingly, since the set of textual descriptions 206 includes n descriptions, the set of numerical representations 210 can have n representations (e.g., one numerical representation per textual description). For example, the embedding component 116 can apply word embedding to the textual description 1 so as to yield a numerical representation 1, and the embedding component 116 can apply word embedding to the textual description n so as to yield a numerical representation n. In various instances, the numerical representation 1 can be considered as any suitable number of scalars, any suitable number of vectors, any suitable number of matrices, any suitable number of tensors, and/or any suitable combination thereof that can represent and/or otherwise correspond to the textual description 1 (e.g., the numerical representation 1 can be a real-valued vector having any suitable number of elements). Similarly, the numerical representation n can be considered as any suitable number of scalars, any suitable number of vectors, any suitable number of matrices, any suitable number of tensors, and/or any suitable combination thereof that can represent and/or otherwise correspond to the textual description n (e.g., the numerical representation n can be a real-valued vector having any suitable number of elements).

In some cases, the numerical representation 208 and each of the set of numerical representations 210 can have the same dimensionality as each other (e.g., can have the same number and/or arrangement of elements as each other).

Referring back to FIG. 2, in various embodiments, the category component 118 can electronically store, electronically maintain, electronically control, and/or otherwise electronically access a machine learning classifier 212. In various aspects, the machine learning classifier 212 can exhibit any suitable artificial intelligence architecture, as desired. For example, the machine learning classifier 212 can exhibit a deep learning neural network architecture. In such case, the machine learning classifier 212 can include any suitable number of layers, any suitable numbers of neurons in various layers, any suitable activations functions, weight matrices, and/or bias values in various neurons, and/or any suitable interneuron connections. As another example, the machine learning classifier 212 can be a fully-connected layer in conjunction with a one-vs-rest (OVR) classifier layer. As still other examples, the machine learning classifier 212 can be a support vector machine, a naïve Bayes model, a logistic regression model, and/or a tree-based model.

In any case, the category component 118 can electronically utilize the machine learning classifier 212 to generate a category label 214, based on the numerical representation 208 and based on the set of numerical representations 210. In various aspects, the category label 214 can be one or more scalars, one or more vectors, one or more matrices, one or more tensors, one or more character strings, and/or any suitable combination thereof which can be considered as representing and/or indicating a class, category, and/or context group to which the product/service belongs. This is further explained with respect to FIGS. 6-8.

Figure 6:
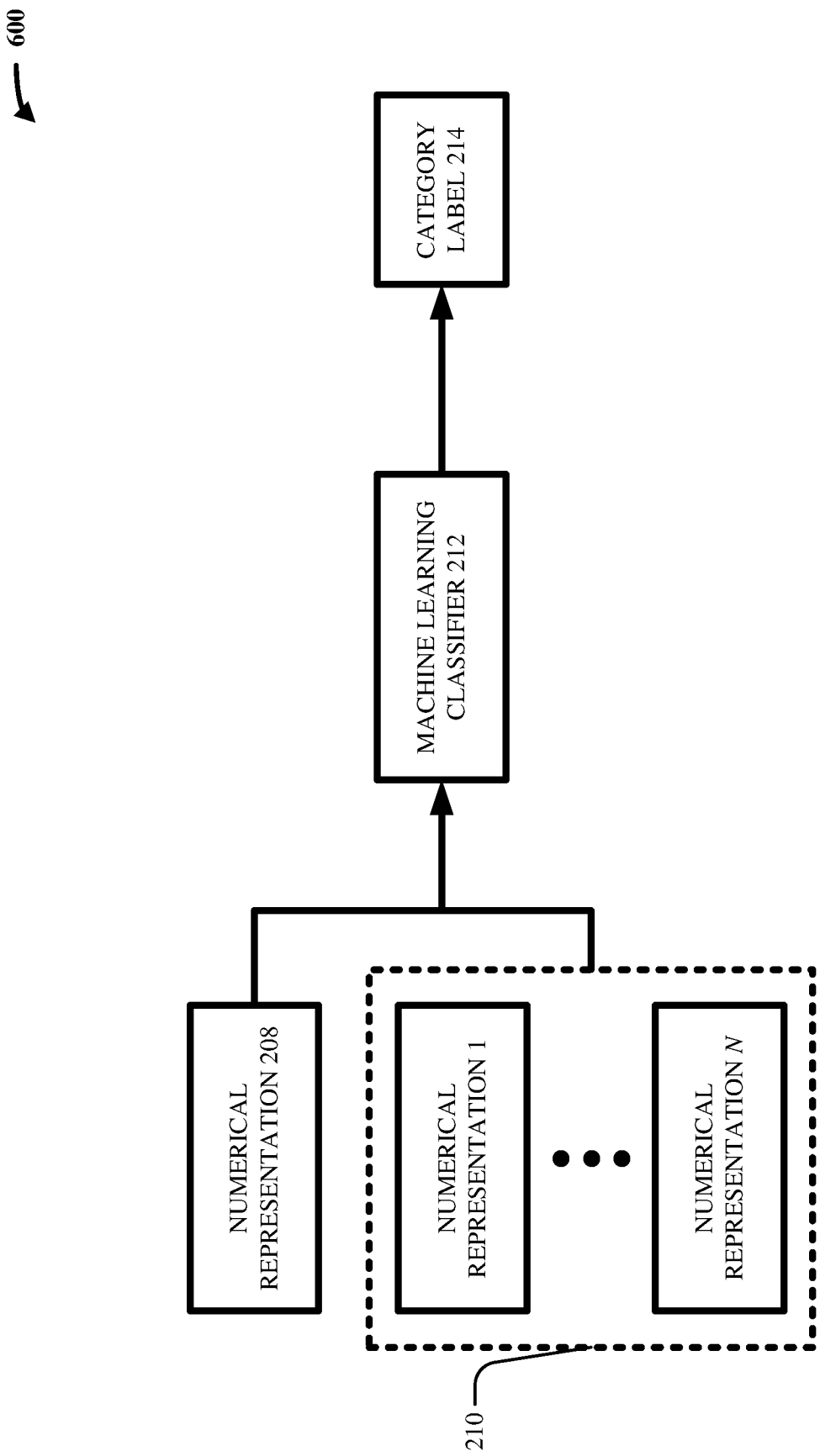
FIGS. 6-8 illustrate example, non-limiting block diagrams showing how a category label can be inferred by a machine learning classifier based on numerical representations of textual descriptions in accordance with one or more embodiments described herein.
Figure 7:
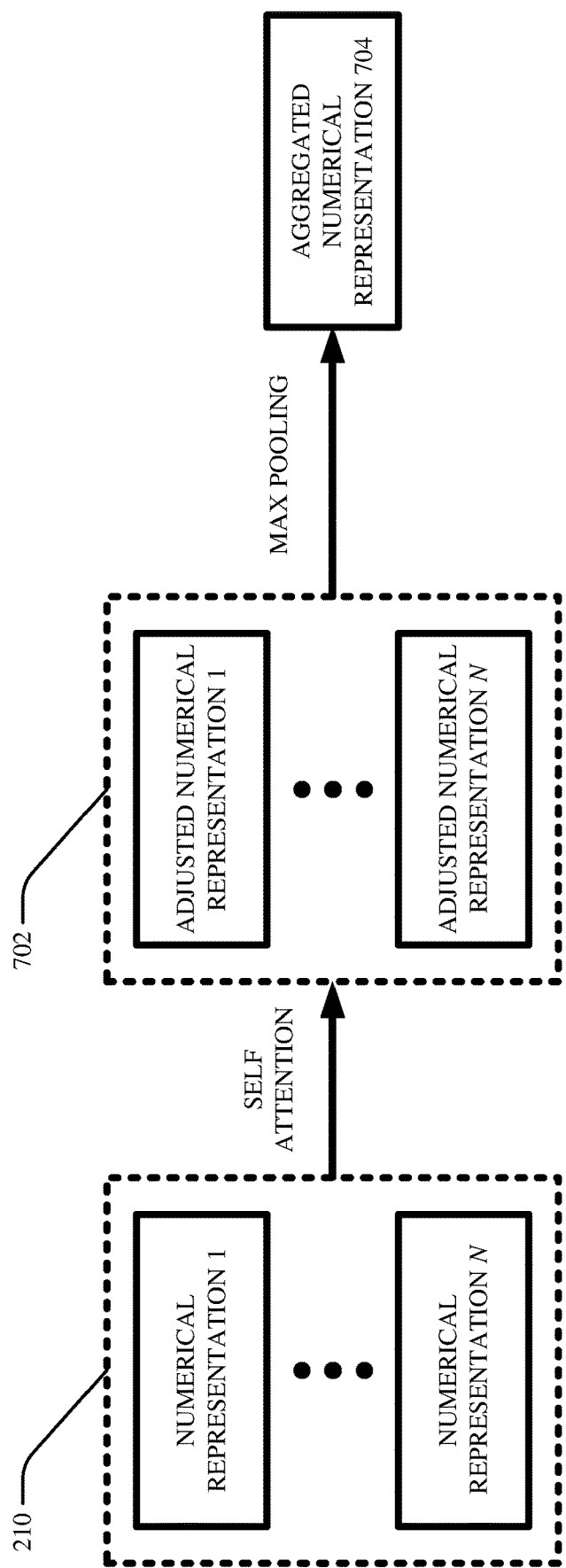
Figure 8:
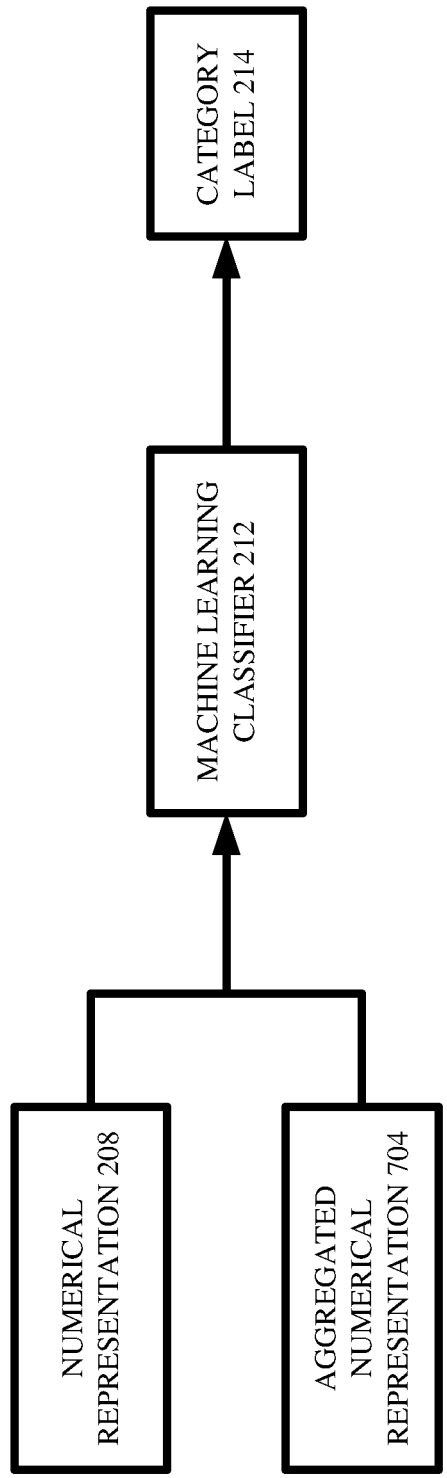

FIGS. 6-8 illustrate example, non-limiting block diagrams 600, 700, and 800 showing how the category label 214 can be inferred by the machine learning classifier 212 based on the numerical representation 208 and based on the set of numerical representations 210 in accordance with one or more embodiments described herein.

First, consider FIG. 6. As shown in FIG. 6, the machine learning classifier 212 can, in some embodiments, be configured to receive as input both the numerical representation 208 and the set of numerical representations 210, and the machine learning classifier 212 can be configured to produce as output the category label 214. For example, in various aspects, the numerical representation 208 and the set of numerical representations 210 can be concatenated together, the category component 118 can feed such concatenation to an input layer of the machine learning classifier 212, such concatenation can complete a forward pass through one or more hidden layers of the machine learning classifier 212, and an output layer of the machine learning classifier 212 can compute the category label 214 based on activations provided by the one or more hidden layers.

Next, consider FIGS. 7-8. As shown in FIG. 7, in various alternative embodiments, the category component 118 can electronically apply any suitable self-attention technique to the set of numerical representations 210, which can yield a set of adjusted numerical representations 702. Since the set of numerical representations 210 can include n representations, the set of adjusted numerical representations 702 can likewise include n representations: an adjusted numerical representation 1 to an adjusted numerical representation n. As those having ordinary skill in the art will appreciate, application of self-attention to the set of numerical representations 210 can cause of each of the set of numerical representations 210 to become weighted according to a corresponding level of importance (e.g., each numerical representation can query and/or interact with all of the others in the set of numerical representations 210 so as to derive a set of weights, and the set of numerical representations 210 can thus be updated and/or scaled according to the set of weights). In other words, the adjusted numerical representation 1 can be considered as a weighted version of the numerical representation 1 (e.g., can have a same dimensionality but a different magnitude as the numerical representation 1). Similarly, the adjusted numerical representation n can be considered as a weighted version of the numerical representation n (e.g., can have a same dimensionality but a different magnitude as the numerical representation n).

In various aspects, as shown, after generating the set of adjusted numerical representations 702, the category component 118 can electronically apply any suitable max pooling technique to the set of adjusted numerical representations 702, thereby yielding an aggregated numerical representation 704. Accordingly, as those having ordinary skill in the art will appreciate, the aggregated numerical representation 704 can, in some cases, be considered as the average of the all of the set of adjusted numerical representations 702. In various instances, the dimensionality of the aggregated numerical representation 704 (e.g., the number and/or arrangement of elements in the aggregated numerical representation 704) can be the same as that of each of the set of adjusted numerical representations 702.

Next, consider FIG. 8. As shown in FIG. 8, the machine learning classifier 212 can, in some embodiments, be configured to receive as input both the numerical representation 208 and the aggregated numerical representation 704, and the machine learning classifier 212 can be configured to produce as output the category label 214. For example, in various aspects, the numerical representation 208 and the aggregated numerical representation 704 can be concatenated together, the category component 118 can feed such concatenation to an input layer of the machine learning classifier 212, such concatenation can complete a forward pass through one or more hidden layers of the machine learning classifier 212, and an output layer of the machine learning classifier 212 can compute the category label 214 based on activations provided by the one or more hidden layers.

In any case, the category component 118 can electronically generate the category label 214, by leveraging the machine learning classifier 212, and based on the numerical representation 208 and the set of numerical representations 210.

In various embodiments, the execution component 120 can electronically perform any suitable electronic and/or computerized action based on the category label 214. As mentioned above, the category label 214 can be considered as indicating and/or representing a class, category, group, and/or context of the product/service that is described by the textual description 104. Thus, in various aspects, the execution component 120 can electronically compare the category label 214 to a set of restricted categories (not shown) which can be known to correspond to a given regulatory restriction, and the execution component 120 can prevent and/or permit the electronic transaction involving the product/service based on such comparison. For example, if the comparison reveals that the category label 214 does not match any of the set of restricted categories, then the execution component 120 can determine/infer/conclude that the product/service is not subject to the given regulatory restriction. In such case, the execution component 120 can permit the electronic transaction. In contrast, if the comparison reveals that the category label 214 matches at least one of the set of restricted categories, then the execution component 120 can determine/infer/conclude that the product/service is subject to the given regulatory restriction. In such case, the execution component 120 can prevent, block, and/or cancel the electronic transaction. Alternatively, in such case, the execution component 120 can generate and/or transmit an alert message (not shown) to any suitable computing device (not shown), where such alert message can indicate that the product/service is subject to the given regulatory restriction. Indeed, in some instances, the execution component 120 can electronically render the alert message on any suitable computer screen/monitor as desired.

Figure 9:
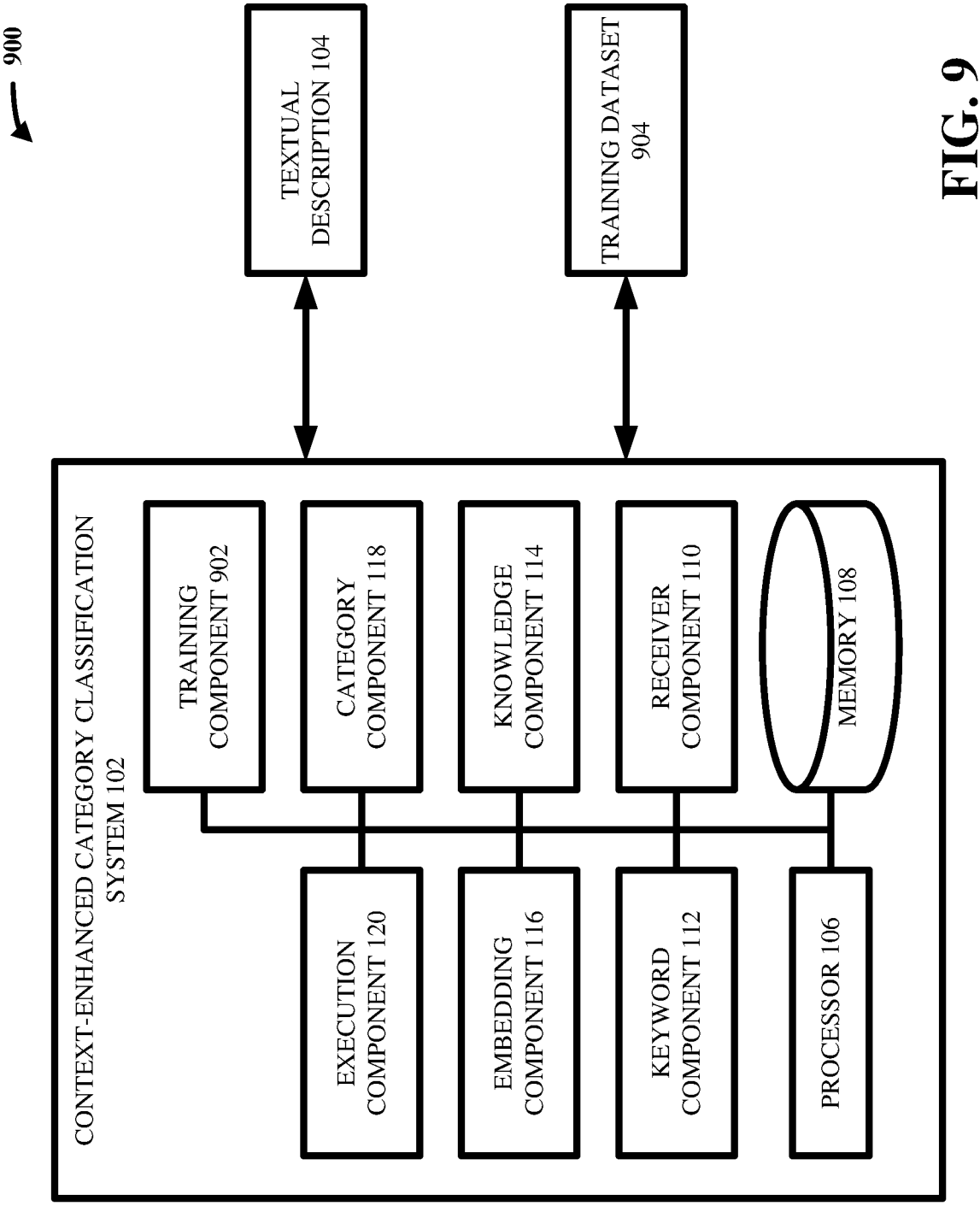
FIG. 9 illustrates a high-level block diagram of an example, non-limiting system including a training component and a training dataset that facilitates context-enhanced category classification in accordance with one or more embodiments described herein.

FIG. 9 illustrates a high-level block diagram of an example, non-limiting system 900 including a training component and a training dataset that can facilitate context-enhanced category classification in accordance with one or more embodiments described herein. As shown, the system 900 can, in some cases, include the same components as the system 200, and can further include a training component 902 and/or a training dataset 904.

In order to facilitate the above-described functionality of the machine learning classifier 212, the machine learning classifier 212 should first undergo training. Accordingly, in various embodiments, the receiver component 110 can electronically receive, retrieve, and/or access the training dataset 904, and the training component 902 can train the machine learning classifier 212 based on the training dataset 904. This is further described with respect to FIGS. 10-11.

Figure 10:
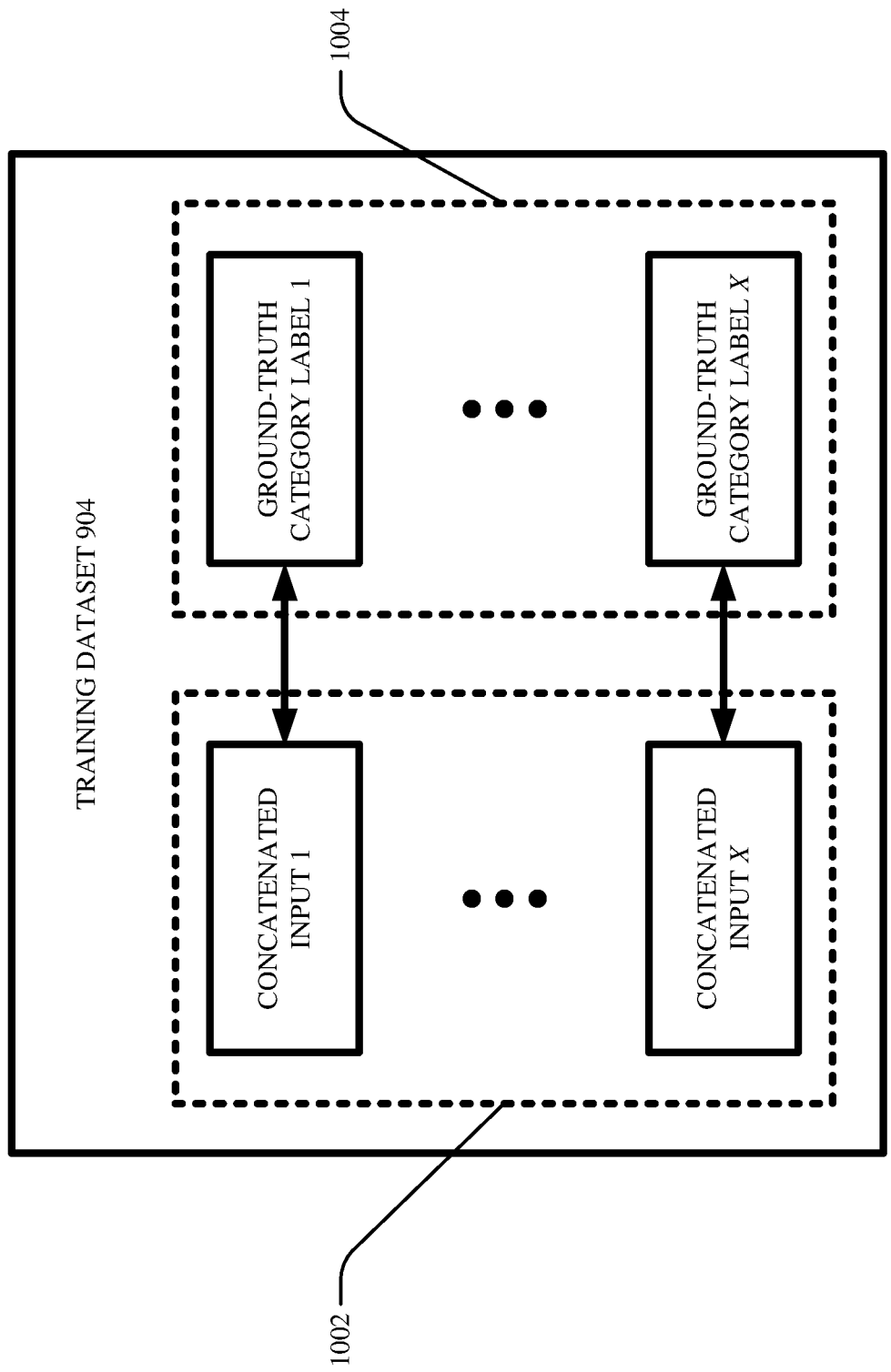
FIG. 10 illustrates an example, non-limiting block diagram of a training dataset in accordance with one or more embodiments described herein.

FIG. 10 illustrates an example, non-limiting block diagram 1000 of a training dataset in accordance with one or more embodiments described herein. In other words, FIG. 10 depicts a non-limiting example embodiment of the training dataset 904.

In various embodiments, the training dataset 904 can include a set of concatenated inputs 1002 and/or a set of ground-truth category labels 1004. In various aspects, the set of concatenated inputs 1002 can include x inputs for any suitable positive integer x: a concatenated input 1 to a concatenated input x. In some cases, each of the set of concatenated inputs 1002 can have the same dimensionality (e.g., the same number and/or arrangement of elements) as a concatenation that is formed by concatenating the numerical representation 208 together with all of the set of numerical representations 210 (e.g., so that each of the set of concatenated inputs 1002 can be able to be received/analyzed by the machine learning classifier 212 as described with respect to FIG. 6). In some other cases, each of the set of concatenated inputs 1002 can have the same dimensionality as a concatenation that is formed by concatenating the numerical representation 208 together with the aggregated numerical representation 704 (e.g., so that each of the set of concatenated inputs 1002 can be able to be received/analyzed by the machine learning classifier 212 as described with respect to FIGS. 7-8). In either case, each of the set of concatenated inputs 1002 can be considered as corresponding to some known product/service that is and/or was involved in some known electronic transaction (e.g., the concatenated input 1 can correspond to some first product/service involved in a first electronic transaction, and the concatenated input x can correspond to some x-th product/service involved in an x-th electronic transaction).

In various aspects, the set of ground-truth category labels 1004 can respectively correspond to the set of concatenated inputs 1002. Accordingly, the set of ground-truth category labels 1004 can include x labels: a ground-truth category label 1 to a ground-truth category label x. In various aspects, the ground-truth category label 1 can correspond to the concatenated input 1. Thus, the ground-truth category label 1 can be considered as representing an annotation that indicates the correct/accurate class, category, group, and/or context that is known to correspond to the concatenated input 1 (e.g., that is known to correspond to the first product/service). Likewise, in various instances, the ground-truth category label x can correspond to the concatenated input x. So, the ground-truth category label x can be considered as representing an annotation that indicates the correct/accurate class, category, group, and/or context that is known to correspond to the concatenated input x (e.g., that is known to correspond to the x-th product/service).

Figure 11:
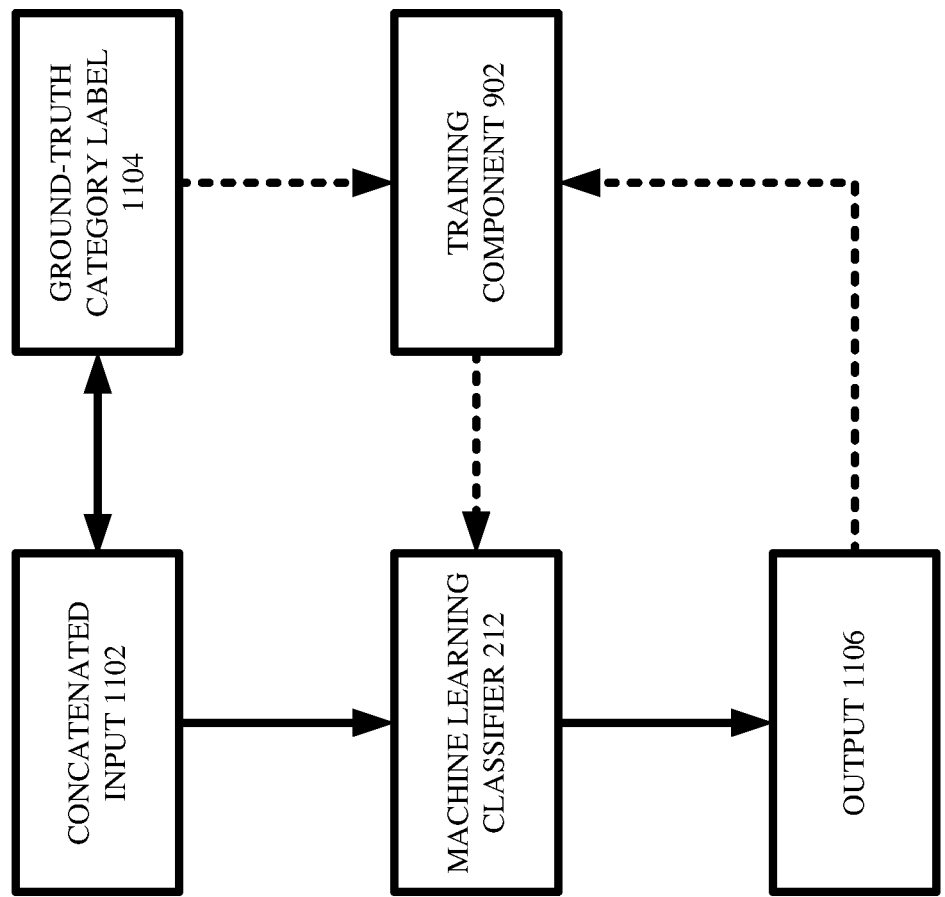
FIG. 11 illustrates an example, non-limiting block diagram showing how a machine learning classifier can be trained in accordance with one or more embodiments described herein.

FIG. 11 illustrates an example, non-limiting block diagram 1100 showing how the machine learning classifier 212 can be trained on the training dataset 904 in accordance with one or more embodiments described herein.

In various embodiments, the internal parameters (e.g., weights, biases) of the machine learning classifier 212 can be randomly initialized. In various aspects, the training component 902 can select from the training dataset 904 a concatenated input 1102 and a ground-truth category label 1104 that corresponds to the concatenated input 1102. In various instances, the training component 902 can execute the machine learning classifier 212 on the concatenated input 1102, which can cause the machine learning classifier 212 to produce some output 1106. For example, in some cases, an input layer of the machine learning classifier 212 can receive the concatenated input 1102, the concatenated input 1102 can complete a forward pass through one or more hidden layers of the machine learning classifier 212, and an output layer of the machine learning classifier 212 can calculate the output 1106 based on activations values that generated by the one or more hidden layers. In various cases, the output 1106 can be considered as representing and/or indicating the category, class, group, and/or context that the machine learning classifier 212 believes and/or infers should correspond to the concatenated input 1102. In contrast, the ground-truth category label 1104 can be considered as representing and/or indicating the category, class, group, and/or context that is known to correspond to the concatenated input 1102. Note that, if the machine learning classifier 212 has so far undergone no and/or little training, the output 1106 can be highly inaccurate (e.g., the output 1106 can be very different from the ground-truth category label 1104). In any case, the training component 902 can compute an error/loss (e.g., cross-entropy, Euclidean distance) between the output 1106 and the ground-truth category label 1104. Accordingly, in various aspects, the training component 902 can update, via backpropagation, the internal parameters (e.g., weights, biases) of the machine learning classifier 212, based on the computed error/loss. In various instances, the training component 902 can repeat this training procedure for each of the concatenated inputs in the training dataset 904, with the ultimate result being that the internal parameters of the machine learning classifier 212 can become iteratively optimized for accurately inferring category labels based on inputted concatenations.

As those having ordinary skill in the art will appreciate, any suitable training batch sizes, any suitable training termination criteria, and/or any suitable error/loss functions can be implemented as desired.

As those having ordinary skill in the art will appreciate, it can sometimes be difficult and/or tedious to manually annotate training data. In other words, it can be difficult/tedious to identify and/or generate the set of ground-truth category labels 1004 when given the set of concatenated inputs 1002. To help ameliorate this problem, the present inventors devised the following solution which can make use of available uniform resource locators (URLs). More specifically, as mentioned above, each of the set of concatenated inputs 1002 can be considered as corresponding to some known product/service that is and/or was involved in some known electronic transaction. For instance, the concatenated input 1 can correspond to some first product/service involved in a first electronic transaction, and the concatenated input x can correspond to some x-th product/service involved in an x-th electronic transaction. In various aspects, during collation and/or collection of the set of concatenated inputs 1002, it can often be the case that the products/services that correspond to the set of concatenated inputs 1002 were manually investigated by subject matter experts. During such investigations, the subject matter experts can have written comments pertaining to the products/services, and such comments can often include specific URLs that correspond to the products/services (e.g., URLs to the specific webpages which offer the products/services for sale). In such case, the set of concatenated inputs 1002 can thus be considered as corresponding to a set of URLs. For example, the concatenated input 1 can correspond to the first product/service, and the written comments pertaining to the first product/service can include a first URL. Similarly, the concatenated input x can correspond to the x-th product/service, and the written comments pertaining to the x-th product/service can include an x-th URL.

As recognized by the present inventors, a given URL that is associated with a given product/service (e.g., a given URL of a webpage that offers the given product/service for sale) can be considered as indicating and/or otherwise representing a particular category, class, group, and/or context of the given product/service. For instance, if the given URL is for a lawn-care e-commerce website, it can be inferred that the given product/service relates to a lawn-care context. As another example, if the given URL is for a beauty and/or cosmetics e-commerce website, it can inferred that the given product/service relates to a beauty and/or cosmetics context. Accordingly, in various embodiments, a ground-truth category label can often be inferred and/or determined for a given concatenated input that corresponds to a given product/service, based on a URL that is included in the written comments that pertain to the given product/service. In other words, the set of concatenated inputs 1002 can correspond to a set of URLs, and the set of ground-truth category labels 1004 can be generated and/or assigned based on that set of URLs. In this way, a level of tediousness and/or difficulty associated with annotating training data can be reduced.

Figure 12:
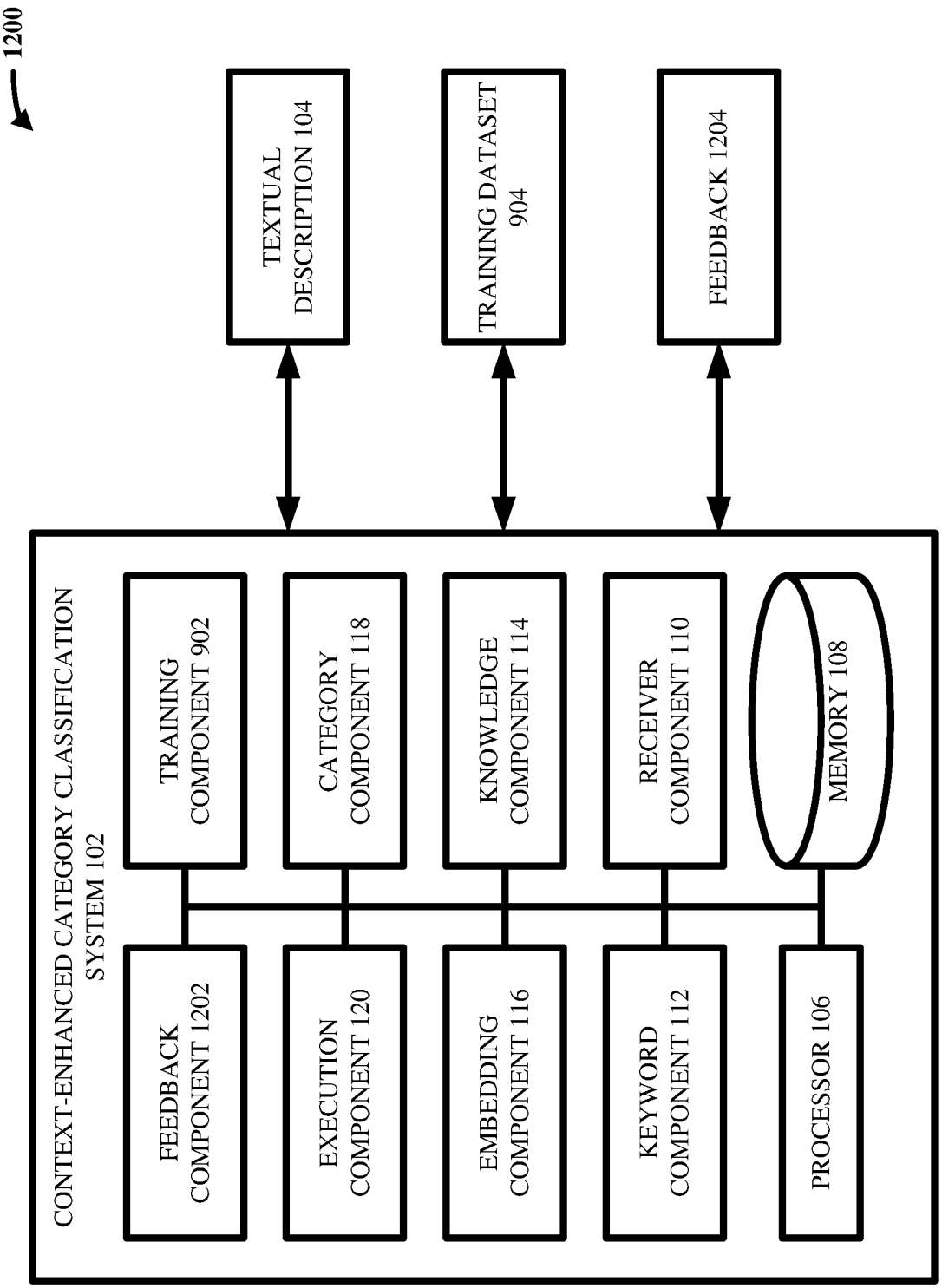
FIG. 12 illustrates a high-level block diagram of an example, non-limiting system including a feedback component that facilitates context-enhanced category classification in accordance with one or more embodiments described herein.

FIG. 12 illustrates a high-level block diagram of an example, non-limiting system 1200 including a feedback component that can facilitate context-enhanced category classification in accordance with one or more embodiments described herein. As shown, the system 1200 can, in some cases, include the same components as the system 900, and can further include a feedback component 1202 and/or feedback 1204.

In various embodiments, the receiver component 110 can electronically receive, retrieve, and/or otherwise access some feedback 1204. In various aspects, the machine learning classifier 212 can encounter, during deployment and/or inferencing, any suitable number of unannotated concatenated inputs (e.g., concatenated inputs for which ground-truth category labels are not available). Accordingly, in various instances, the feedback 1204 can be any suitable electronic information and/or data that indicates and/or represents ground-truth category labels for any suitable subset of such unannotated concatenated inputs. In various cases, the feedback 1204 can be manually created by subject matter experts that manually review the unannotated concatenated inputs encountered by the machine learning classifier 212. In any case, the feedback component 1202 can electronically compute a performance metric (e.g., an accuracy score, a precision score, a recall score) of the machine learning classifier 212 based on the feedback 1204, and the feedback component 1202 can electronically perform any suitable electronic and/or computerized action based on the performance metric. For example, the feedback component 1202 can electronically compare the performance metric to any suitable threshold value. If the performance metric satisfies the threshold value, the feedback component 1202 can generate and/or transmit an electronic alert and/or message that indicates that the machine learning classifier 212 does not require additional training. On the other hand, if the performance metric fails to satisfy the threshold value, the feedback component 1202 can generate and/or transmit an electronic alert and/or message that indicates that the machine learning classifier 212 requires additional training (e.g., indicating that the machine learning classifier 212 should undergo retraining). In some aspects, the training component 902 can facilitate retraining of the machine learning classifier 212, when the feedback component 1202 determines/concludes that retraining is warranted.

In some cases, new feedback can be received at any suitable temporal intervals, so as to keep the performance metric of the machine learning classifier 212 at and/or above the threshold value. For example, in various instances, sampling and/or manually annotating (e.g., receiving feedback for) 10% of unannotated concatenated inputs that are encountered by the machine learning classifier 212 on a monthly basis can help the machine learning classifier 212 to maintain sufficient performance.

Figure 13:
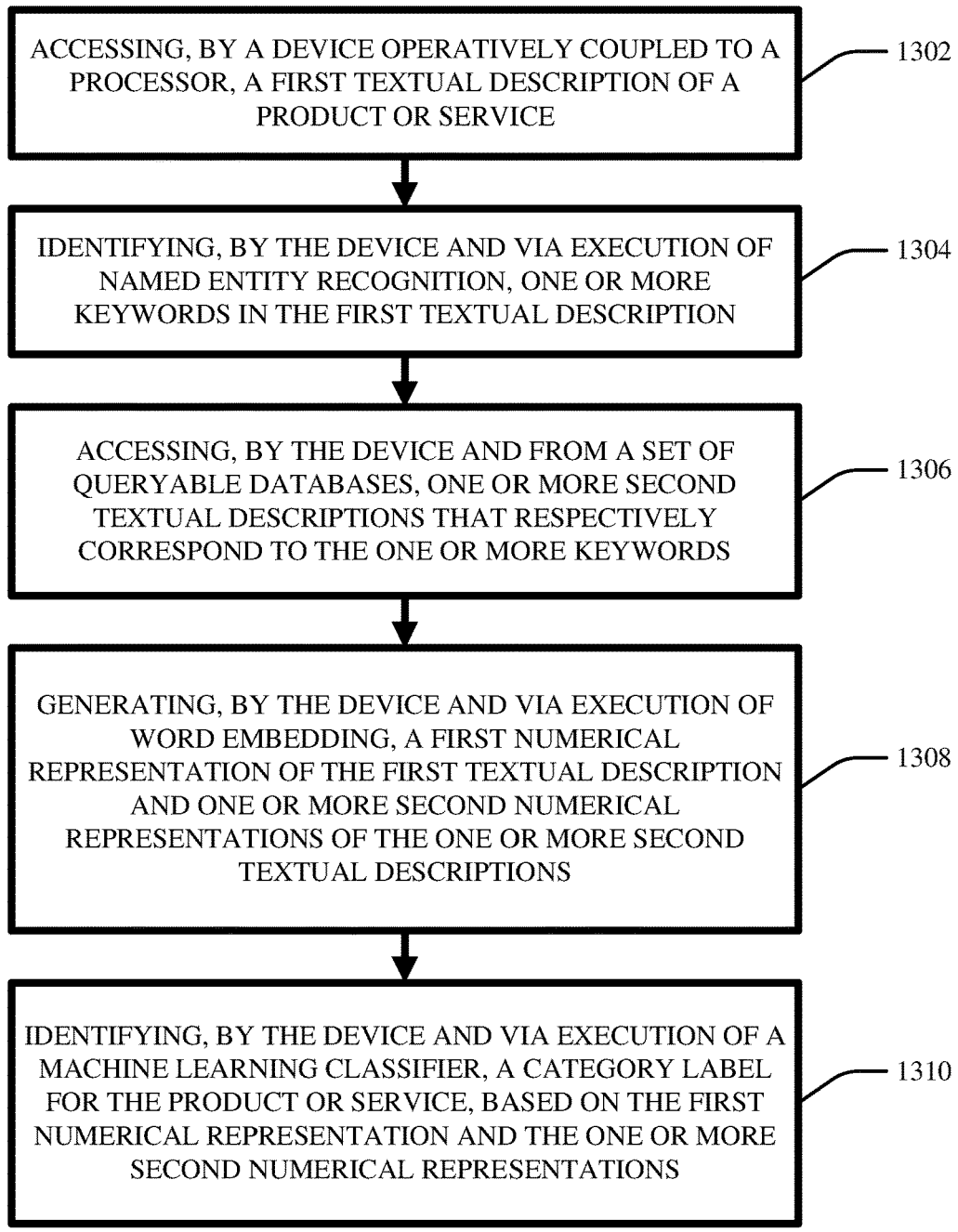
FIGS. 13-14 illustrate high-level flow diagrams of example, non-limiting computer-implemented methods that facilitate context-enhanced category classification in accordance with one or more embodiments described herein.
Figure 14:
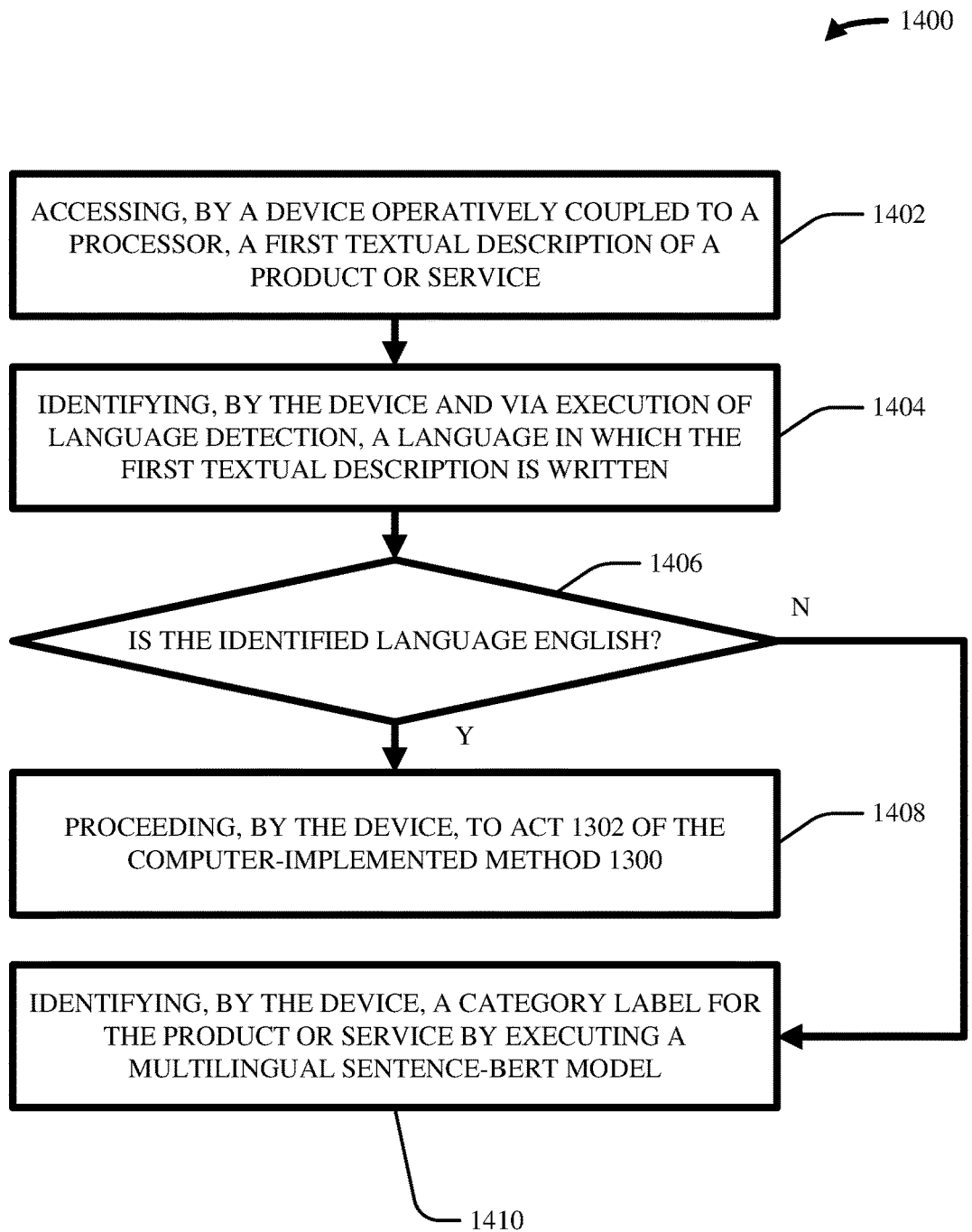

FIGS. 13-14 illustrate high-level flow diagrams of example, non-limiting computer-implemented methods 1300 and 1400 that can facilitate context-enhanced category classification in accordance with one or more embodiments described herein. In various cases, the context-enhanced category classification system 102 can electronically facilitate the computer-implemented methods 1300 and/or 1400.

First, consider FIG. 13. In various embodiments, act 1302 can include accessing, by a device (e.g., via 110) operatively coupled to a processor, a first textual description (e.g., 104) of a product and/or service. In various cases, the first textual description can be a title and/or definition corresponding to the product/service.

In various aspects, act 1304 can include identifying, by the device (e.g., via 112) and via execution of named entity recognition, one or more keywords (e.g., 202) in the first textual description. In various cases, the one or more keywords can be considered as describing and/or explaining something about the product/service.

In various instances, act 1306 can include accessing, by the device (e.g., via 114) and from a set of queryable databases (e.g., 204), one or more second textual descriptions (e.g., 206) that respectively correspond to the one or more keywords. In various cases, the one or more second textual descriptions can be considered as defining the one or more keywords. Furthermore, as mentioned above, such definitions of the one or more keywords can be considered as indicative and/or suggestive of contextual information of the product/service.

In various aspects, act 1308 can include generating, by the device (e.g., via 116) and via execution of word embedding, a first numerical representation (e.g., 208) of the first textual description and one or more second numerical representations (e.g., 210) of the one or more second textual descriptions. In various cases, such numerical representations can be considered as vectors representing the textual descriptions, which can allow the textual descriptions to be mathematically analyzed.

In various instances, act 1310 can include identifying, by the device (e.g., via 118), and via execution of a machine learning classifier (e.g., 212), a category label (e.g., 214) for the product/service, based on the first numerical representation and the one or more second numerical representations. As mentioned above, the category label can indicate and/or represent a category, class, group, and/or context to which the product/service belongs. Moreover, since the category label can be based on the one or more second textual descriptions and not just on the first textual description, the category label can have a higher likelihood of accurately identifying the true category, class, group, and/or context to which the product/service belongs.

Although not explicitly shown in FIG. 13, the product/service can be associated with an electronic transaction, and the computer-implemented method 1300 can further include: comparing, by the device (e.g., via 120) the category label with one or more restricted categories; and when the category label matches at least one of the one or more restricted categories, initiating, by the device (e.g., via 120) a remedial action with respect to the electronic transaction. In various cases, the remedial action can include cancelling the electronic transaction. In various other cases, the remedial action can include generating a restriction alert.

Although not explicitly shown in FIG. 13, the machine learning classifier can receive as input the first numerical representation concatenated with the one or more second numerical representations (e.g., as shown in FIG. 6), and the machine learning classifier can produce as output the category label.

Although not explicitly shown in FIG. 13, the computer-implemented method 1300 can further include: applying, by the device (e.g., via 118), self-attention to the one or more second numerical representations, thereby yielding one or more adjusted numerical representations (e.g., 702); and applying, by the device (e.g., via 118), max pooling to the one or more adjusted numerical representations, thereby yielding an aggregated numerical representation (e.g., 704), wherein the machine learning classifier can receive as input the first numerical representation concatenated with the aggregated numerical representation, and wherein the machine learning classifier can produce as output the category label.

Although not explicitly shown in FIG. 13, the computer-implemented method 1300 can further include: accessing, by the device (e.g., via 110), a training dataset (e.g., 904), wherein the training dataset can include a set of concatenated inputs (e.g., 1002) and a set of ground-truth category labels (e.g., 1004) that respectively correspond to the set of concatenated inputs; and training, by the device (e.g., via 902), the machine learning classifier via backpropagation on the training dataset (e.g., as shown in FIG. 11). In various cases, the set of concatenated inputs can respectively correspond to a set of uniform resource locators, and the computer-implemented method 1300 can further include: assigning the set of ground-truth category labels to the set of concatenated inputs based on the set of uniform resource locators.

Now, consider FIG. 14. In various embodiments, the herein-described teachings can be applied to textual descriptions that are written in any suitable language. However, in some cases, it can be desirable to apply the herein-described teachings to textual descriptions that are written in some given language (e.g., English) and to apply different category-identification techniques to textual descriptions that are written in a different language (e.g., not English). In various cases, the computer-implemented method 1400 can be considered as facilitating such multi-language analysis.

In various aspects, act 1402 can include accessing, by a device (e.g., via 110) operatively coupled to a processor, a first textual description (e.g., 104) of a product and/or service. Again, in various cases, the first textual description can be a title and/or definition corresponding to the product/service.

In various instances, act 1404 can include identifying, by the device (e.g., via any suitable additional component of the context-enhanced category classification system 102) and via execution of language detection, a language in which the first textual description is written. As those having ordinary skill in the art will appreciate, any suitable language detection technique can be executed as desired.

In various aspects, act 1406 can include determining, by the device (e.g., via any suitable additional component of the context-enhanced category classification system 102), whether the identified language is English (and/or any other first language). If so, the computer-implemented method 1400 can proceed to act 1408. If not, the computer-implemented method 1400 can proceed to act 1410.

In various instances, act 1408 can include proceeding, by the device (e.g., via 102), to act 1302 of the computer-implemented method 1300.

In various aspects, act 1410 can include identifying, by the device (e.g., via any suitable additional component of the context-enhanced category classification system 102), a category label for the product/service by executing a multilingual sentence-BERT model on the first textual description. As those having ordinary skill in the art will appreciate, a multilingual sentence-BERT model is a mere non-limiting example for case of explanation. Indeed, as those having ordinary skill in the art will understand, there exist various multilingual models that can be implemented so as to generate a category label based on an inputted textual description, regardless of the language in which the inputted textual description is written. Accordingly, as shown in the computer-implemented method 1400, various embodiments as described herein can include generating the category label (e.g., 104) by the herein-described teachings when the textual description is written in some predetermined language (e.g., English) and can include generating the category label by an existing multilingual model when the textual description is written in a language other than the predetermined language (e.g., not English). In any case, however, such existing multilingual models do not exhibit the structures and/or components of the context-enhanced category classification system 102.

Various embodiments described herein include a computerized tool that can electronically generate a category label for a given product/service, based on a textual description of the given product/service, and based on contextual information relating to the given product/service. In some cases, such contextual information can be definitions of one or more keywords that are present within the textual description of the given product/service. In any case, utilization of such context information can increase the accuracy of the generated category label, so that it can be properly determined whether the given product/service is subject to a regulatory restriction. For at least these reasons, such embodiments certainly constitute a useful and practical application of computers.

In various instances, machine learning algorithms and/or models can be implemented in any suitable way to facilitate any suitable aspects described herein. To facilitate some of the above-described machine learning aspects of various embodiments of the subject innovation, consider the following discussion of artificial intelligence (AI). Various embodiments of the present innovation herein can employ artificial intelligence to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z_1, z_2, z_3, z_4, z_n)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Those having ordinary skill in the art will appreciate that the herein disclosure describes non-limiting examples of various embodiments of the subject innovation. For case of description and/or explanation, various portions of the herein disclosure utilize the term "each" when discussing various embodiments of the subject innovation. Those having ordinary skill in the art will appreciate that such usages of the term "each" are non-limiting examples. In other words, when the herein disclosure provides a description that is applied to "each" of some particular object and/or component, it should be understood that this is a non-limiting example of various embodiments of the subject innovation, and it should be further understood that, in various other embodiments of the subject innovation, it can be the case that such description applies to fewer than "each" of that particular object and/or component.

Figure 15:
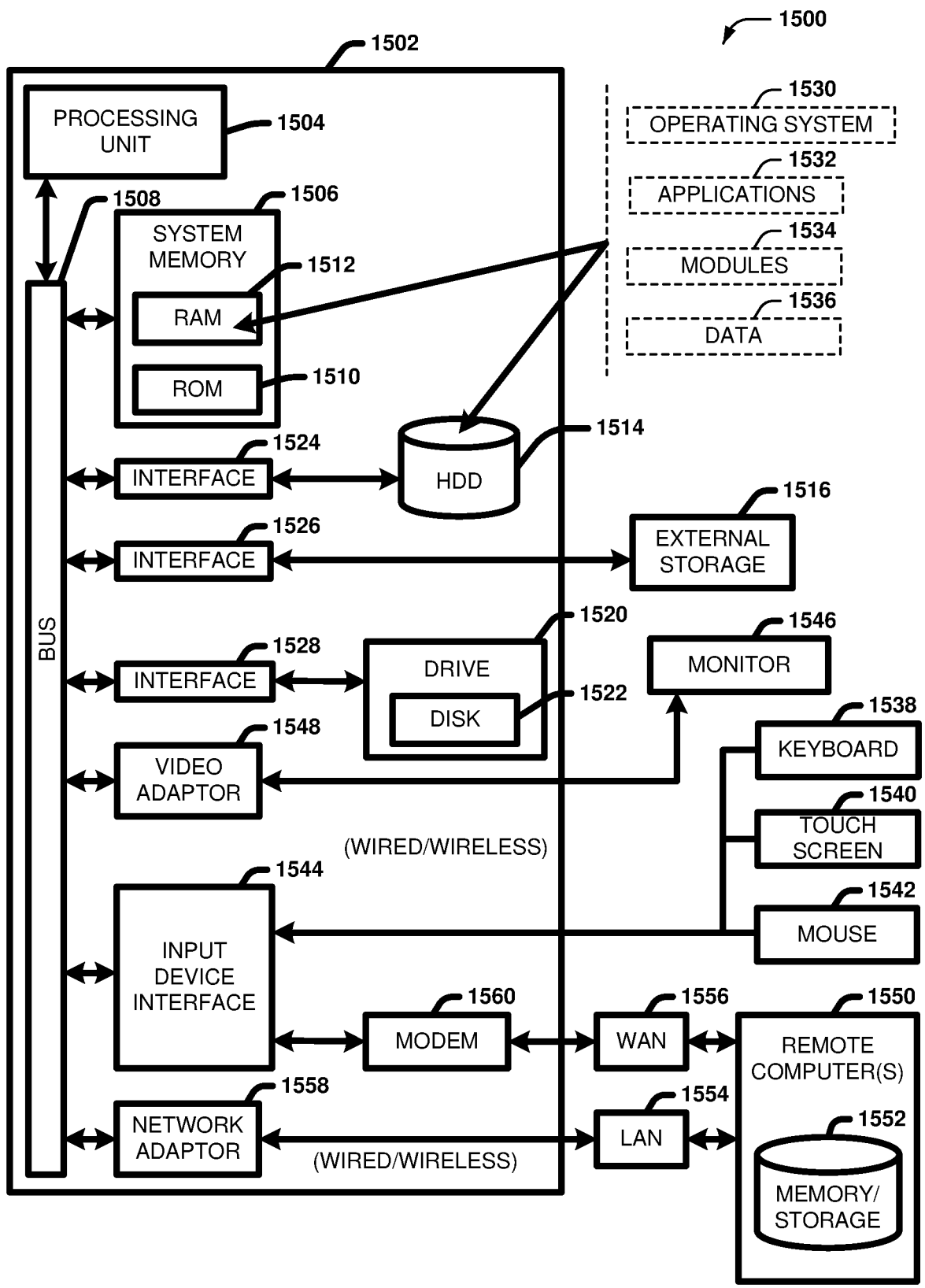
FIG. 15 illustrates a block diagram of an example, non-limiting operating environment in which one or more embodiments described herein can be facilitated.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and a drive 1520, e.g., such as a solid state drive, an optical disk drive, which can read or write from a disk 1522, such as a CD-ROM disc, a DVD, a BD, etc. Alternatively, where a solid state drive is involved, disk 1522 would not be included, unless separate. While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and drive 1520 can be connected to the system bus 1508 by an HDD interface 1524, an external storage interface 1526 and a drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application. Further, computer 1502 can be enable with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above, such as but not limited to a network virtual machine providing one or more aspects of storage or processing of information. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 16:
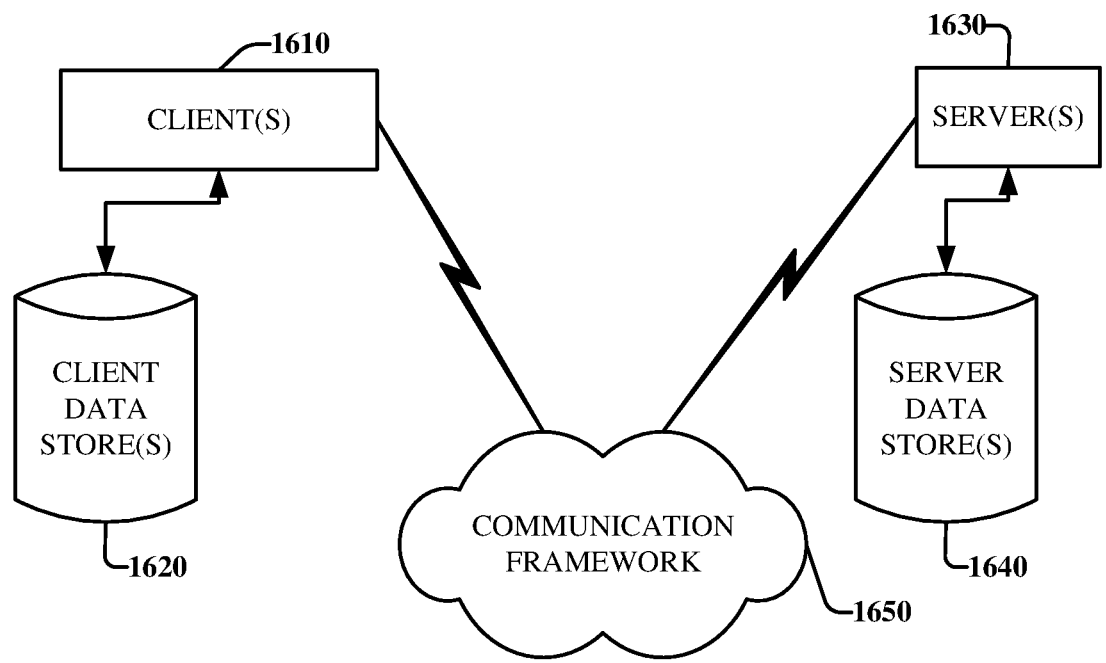
FIG. 16 illustrates an example networking environment operable to execute various implementations described herein.

FIG. 16 is a schematic block diagram of a sample computing environment 1600 with which the disclosed subject matter can interact. The sample computing environment 1600 includes one or more client(s) 1610. The client(s) 1610 can be hardware and/or software (e.g., threads, processes, computing devices). The sample computing environment 1600 also includes one or more server(s) 1630. The server(s) 1630 can also be hardware and/or software (e.g., threads, processes, computing devices). The servers 1630 can house threads to perform transformations by employing one or more embodiments as described herein, for example. One possible communication between a client 1610 and a server 1630 can be in the form of a data packet adapted to be transmitted between two or more computer processes. The sample computing environment 1600 includes a communication framework 1650 that can be employed to facilitate communications between the client(s) 1610 and the server(s) 1630. The client(s) 1610 are operably connected to one or more client data store(s) 1620 that can be employed to store information local to the client(s) 1610. Similarly, the server (s) 1630 are operably connected to one or more server data store(s) 1640 that can be employed to store information local to the servers 1630.

Various embodiments described herein may be a system, a method, an apparatus and/or a computer program product at any possible technical detail level of integration. The computer program product can include a computer readable storage medium (or media) having computer readable program instructions thereon for causing a processor to carry out aspects of various embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments described herein can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of various embodiments described herein.

Aspects of various embodiments are described herein with reference to flowchart illustrations and/or block diagrams of methods, apparatus (systems), and computer program products according to various embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments described herein. In this regard, each block in the flowchart or block diagrams can represent a module, segment, or portion of instructions, which comprises one or more executable instructions for implementing the specified logical function (s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system, comprising:
computer-readable memory storing computer readable instructions;
a machine learning classifier, via which the computer system: (i) examines data, which contain electronic transactions regarding products and/or services, from a plurality of databases to which the machine learning classifier has been granted access, (ii) electronically applies, by an embedding component, a word embedding technique to the electronic transactions to generate a set of numerical representations; (iii) classifies, via a machine learning classifier, the numerical representations into category labels generated by a machine learning model that has been trained to perform named entity recognition and/or word embedding on data regarding the products or services that is provided as inputs to the machine learning model, and (iv) electronically determines if the category labels generated by the machine learning classifier based on outputs of the machine learning model are subject to one or more regulatory restrictions;
at least one processor that executes the computer-executable instructions stored in the computer-readable memory, which causes the computer system to perform operations comprising:
accessing a first textual description of a product or service, wherein the product or service is associated with an electronic transaction;
identifying, via execution of named entity recognition, one or more keywords in the first textual description;
accessing, from a set of queryable databases, one or more second textual descriptions that respectively correspond to the one or more keywords;
generating, via execution of word embedding, a first numerical representation of the first textual description and one or more second numerical representations of the one or more second textual descriptions;
identifying, via execution of a machine learning classifier, a category label for the product or service, based on the first numerical representation and the one or more second numerical representations; and
determining whether to permit the electronic transaction based on the category label.

2. The computer system of claim 1, wherein the product or service is associated with an electronic transaction, and wherein the operations further comprise:
comparing the category label with one or more restricted categories; and
when the category label matches at least one of the one or more restricted categories, initiating a remedial action with respect to the electronic transaction.

3. The computer system of claim 2, wherein the remedial action includes cancelling the electronic transaction.

4. The computer system of claim 2, wherein the remedial action includes generating a restriction alert.

5. The computer system of claim 1, wherein the machine learning classifier receives as input the first numerical representation concatenated with the one or more second numerical representations, and wherein the machine learning classifier produces as output the category label.

6. A computer system, comprising:
computer-readable memory storing computer readable instructions;
a machine learning classifier, via which the computer system: (i) examines data, which contain electronic transactions regarding products and/or services, from a plurality of databases to which the machine learning classifier has been granted access, (ii) electronically applies, by an embedding component, a word embedding technique to the electronic transactions to generate a set of numerical representations; (iii) classifies, via a machine learning classifier, the numerical representations into category labels generated by a machine learning model that has been trained to perform named entity recognition and/or word embedding on data regarding the products or services that is provided as inputs to the machine learning model, and (iv) electronically determines if the category labels generated by the machine learning classifier based on outputs of the machine learning model are subject to one or more regulatory restrictions;
at least one processor that executes the computer-executable instructions stored in the computer-readable memory, which causes the computer system to perform operations comprising:
accessing a first textual description of a product or service, wherein the product or service is associated with an electronic transaction;
identifying, via execution of the named entity recognition, one or more keywords in the first textual description;
accessing, from a set of queryable databases, one or more second textual descriptions that respectively correspond to the one or more keywords;
generating, via execution of the word embedding, a first numerical representation of the first textual description and one or more second numerical representations of the one or more second textual descriptions;
applying self-attention to the one or more second numerical representations, thereby yielding one or more adjusted numerical representations;
applying max pooling to the one or more adjusted numerical representations, thereby yielding an aggregated numerical representation;
identifying, via execution of a machine learning classifier, a category label for the product or service, based on the first numerical representation and the one or more second numerical representations, wherein the machine learning classifier receives as input the first numerical representation concatenated with the aggregated numerical representation, and wherein the machine learning classifier produces as output the category label;
determining whether to permit the electronic transaction based on the category label.

7. A computer system, comprising:
computer-readable memory storing computer readable instructions;

a machine learning classifier, via which the computer system: (i) examines data, which contain electronic transactions regarding products and/or services, from a plurality of databases to which the machine learning classifier has been granted access, (ii) electronically applies, by an embedding component, a word embedding technique to the electronic transactions to generate a set of numerical representations; (iii) classifies, via a machine learning classifier, the numerical representations into category labels generated by a machine learning model that has been trained to perform named entity recognition and/or word embedding on data regarding the products or services that is provided as inputs to the machine learning model, and (iv) electronically determines if the category labels generated by the machine learning classifier based on outputs of the machine learning model are subject to one or more regulatory restrictions;

at least one processor that executes the computer-executable instructions stored in the computer-readable memory, which causes the computer system to perform operations comprising:

accessing a training dataset, wherein the training dataset includes a set of concatenated inputs and a set of ground-truth category labels that respectively correspond to the set of concatenated inputs;

training the machine learning classifier via backpropagation on the training dataset;

accessing a first textual description of a product or service, wherein the product or service is associated with an electronic transaction;

identifying, via execution of the named entity recognition, one or more keywords in the first textual description;

accessing, from a set of queryable databases, one or more second textual descriptions that respectively correspond to the one or more keywords;

generating, via execution of the word embedding, a first numerical representation of the first textual description and one or more second numerical representations of the one or more second textual descriptions;

and identifying, via execution of the machine learning classifier, a category label for the product or service, based on the first numerical representation and the one or more second numerical representations;

determining whether to permit the electronic transaction based on the category label.

8. The computer system of claim 7, wherein the set of concatenated inputs respectively correspond to a set of uniform resource locators, and wherein the operations further comprise:

assigning the set of ground-truth category labels to the set of concatenated inputs based on the set of uniform resource locators.

9. A computer-implemented method, comprising:

accessing, by a computer system, a first textual description of a product or service, wherein the computer system comprises at least one processor and a machine learning classifier, the computer system configured to: (i) examine data, which contain electronic transactions regarding products and/or services, from a plurality of databases to which the machine learning classifier has been granted access, (ii) electronically apply, by an embedding component, a word embedding technique to the electronic transactions to generate a set of numerical representations; (iii) classify, via a machine learning classifier, the numerical representations into category labels generated by a machine learning model that has been trained to perform named entity recognition and/or word embedding on data regarding the products or services that is provided as inputs to the machine learning model, and (iv) electronically determine if the category labels generated by the machine learning classifier based on outputs of the machine learning model are subject to one or more regulatory restrictions;

identifying, by the computer system and via execution of language detection, a language in which the first textual description is written;

when the language in which the first textual description is written is a first language;

identifying, by the computer system and via execution of named entity recognition, one or more keywords in the first textual description;

accessing, by the computer system and from a set of queryable databases that correspond to the identified language, one or more second textual descriptions that respectively correspond to the one or more keywords;

generating, by the computer system and via execution of the word embedding, a first numerical representation of the first textual description and one or more second numerical representations of the one or more second textual descriptions; and identifying, by the computer system and via execution of a machine learning classifier, a category label for the product or service, based on the first numerical representation and the one or more second numerical representations; and when the language in which the first textual description is written is a second language, identifying, by the computer system, the category label via execution of a multilingual model;

determining whether to permit the electronic transaction based on the category label.

10. The computer-implemented method of claim 9, wherein the product or service is associated with an electronic transaction, and further comprising:

initiating a remedial action with respect to the electronic transaction when the category label matches a restricted category.

11. The computer-implemented method of claim 10, wherein the remedial action includes cancelling the electronic transaction or generating a restriction alert.

12. The computer-implemented method of claim 9, further comprising:

accessing, by the computer system, feedback associated with the machine learning classifier; and computing, by the computer system, a performance metric for the machine learning classifier based on the feedback.

13. The computer-implemented method of claim 12, further comprising:

comparing, by the computer system, the performance metric to a threshold value; and when the performance metric fails to satisfy the threshold value, generating, by the computer system, an alert that indicates that the machine learning classifier should undergo additional training.

14. The computer-implemented method of claim 9, wherein the word embedding is facilitated via a sentence-BERT model.

15. The computer-implemented method of claim 9, wherein the machine learning classifier includes a fully-connected layer and a one-vs-rest classification layer.

16. A computer program product for facilitating context-enhanced category classification, the computer program product comprising a non-transitory computer-readable medium having program instructions embodied therewith, the program instructions executable by a processor to cause a computer system to perform operations comprising:

accessing, by the computer system, a first textual description of a product or service that is involved in an electronic transaction, wherein the computer system comprises at least one processor and a machine learning classifier, the computer system configured to: (i) examine data, which contain electronic transactions regarding products and/or services, from a plurality of databases to which the machine learning classifier has been granted access, (ii) electronically apply, by an embedding component, a word embedding technique to the electronic transactions to generate a set of numerical representations; (iii) classify, via a machine learning classifier, the numerical representations into category labels generated by a machine learning model that has been trained to perform named entity recognition and/or word embedding on data regarding the products or services that is provided as inputs to the machine learning model, and (iv) electronically determine if the category labels generated by the machine learning classifier based on outputs of the machine learning model are subject to one or more regulatory restrictions;

identifying, via execution of named entity recognition, one or more keywords in the first textual description;

accessing, from a set of queryable databases, one or more second textual descriptions that respectively correspond to the one or more keywords;

generating, via execution of the word embedding, a first numerical representation of the first textual description and one or more second numerical representations of the one or more second textual descriptions;

identifying, via execution of a machine learning classifier, a category label for the product or service, based on the first numerical representation and the one or more second numerical representations; and determining whether to permit the electronic transaction based on the category label.

17. The computer program product of claim 16, wherein the computer system determines to permit the electronic transaction when the category label does not match at least one of one or more restricted categories, and wherein the computer system determines to not permit the electronic transaction when the category label matches at least one of the one or more restricted categories.

18. The computer program product of claim 16, wherein the operations further comprise: applying self-attention to the one or more second numerical representations, thereby yielding one or more adjusted numerical representations; and applying max pooling to the one or more adjusted numerical representations, thereby yielding an aggregated numerical representation, wherein the machine learning classifier receives as input the first numerical representation concatenated with the aggregated numerical representation, and wherein the machine learning classifier produces as output the category label.

19. The computer program product of claim 16, wherein the operations further comprise: accessing a set of training concatenated inputs, wherein the set of training concatenated inputs respectively correspond to a set of uniform resource locators;

assigning a set of ground-truth category labels to the set of training concatenated inputs based on the set of uniform resource locators; and training the machine learning classifier via backpropagation based on the set of training concatenated inputs and the set of ground-truth category labels.

20. The computer program product of claim 16, wherein the operations further comprise: computing a performance metric for the machine learning classifier based on feedback associated with the machine learning classifier; and when the performance metric fails to satisfy a threshold value, generating an alert that indicates that the machine learning classifier should undergo additional training.

* * * * *